US012741911B2

(12) United States Patent
Misawa et al.

(10) Patent No.: US 12,741,911 B2
(45) Date of Patent: Sep. 22, 2026

(54) DIELECTRIC CERAMIC COMPOSITION AND MULTILAYER CERAMIC ELECTRONIC DEVICE

(71) Applicant: TAIYO YUDEN CO., LTD., Tokyo (JP)

(72) Inventors: Kazuki Misawa, Tokyo (JP); Keiichi Hatano, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 92 days.

(21) Appl. No.: 18/733,552

(22) Filed: Jun. 4, 2024

(65) Prior Publication Data

US 2024/0409470 A1 Dec. 12, 2024

(30) Foreign Application Priority Data

Jun. 6, 2023 (JP) ................................ 2023-093377

(51) Int. Cl.

| | |
|---|---|
| ***H01G 4/30*** | (2006.01) |
| ***C04B 35/468*** | (2006.01) |
| ***H01G 4/12*** | (2006.01) |

(52) U.S. Cl.

CPC ....... *C04B 35/4682* (2013.01); *H01G 4/1227* (2013.01); *C04B 2235/3206* (2013.01); (Continued)

(58) Field of Classification Search

CPC ...... H01G 4/1227; H01G 4/12; H01G 4/1209; H01G 4/1218; H01G 5/013; H01G 4/30; C04B 35/4682; C04B 35/64; C04B 2235/3236; C04B 2235/3206; C04B 2235/3224; C04B 2235/3239; C04B 2235/3256; C04B 2235/3262; (Continued)

(56) References Cited

U.S. PATENT DOCUMENTS

2007/0123413 A1* 5/2007 Suzuki ................ C04B 35/6303 501/138
2007/0135295 A1* 6/2007 Sasabayashi ........ C01G 23/006 501/138

(Continued)

FOREIGN PATENT DOCUMENTS

JP 2011-256091 A 12/2011
JP 2012-131669 A 7/2012

(Continued)

OTHER PUBLICATIONS

U.S. Appl. No. 18/679,359, filed May 30, 2024.

(Continued)

*Primary Examiner* — Timothy J. Dole
*Assistant Examiner* — Esther N Lian
(74) *Attorney, Agent, or Firm* — CHEN YOSHIMURA LLP

(57) ABSTRACT

A dielectric ceramic composition includes a first crystal grain that has a perovskite structure expressed by a general formula of $BaCaTiO_3$, and has a core portion and a shell portion surrounding the core portion and including a rare earth element and manganese, and a second crystal grain in which an elemental ratio of total of barium and calcium to titanium is 0.70 or less and a main component is barium calcium titanate.

20 Claims, 10 Drawing Sheets

(52) U.S. Cl.
CPC ................. *C04B 2235/3224* (2013.01); *C04B 2235/3236* (2013.01); *C04B 2235/3418* (2013.01); *C04B 2235/442* (2013.01); *C04B 2235/768* (2013.01); *C04B 2235/786* (2013.01); *C04B 2235/79* (2013.01); *C04B 2235/85* (2013.01); *H01G 4/30* (2013.01)

(58) Field of Classification Search
CPC .... C04B 2235/3418; C04B 2235/6582; C04B 2235/80; C04B 2235/85; C04B 2235/94
See application file for complete search history.

(56) References Cited

U.S. PATENT DOCUMENTS

2012/0170169 A1* 7/2012 Suzuki ................ C04B 35/4682 501/137
2013/0241347 A1 9/2013 Suzuki et al.
2014/0179508 A1* 6/2014 Park ......................... H01B 3/12 501/137
2016/0204336 A1 7/2016 Shimizu et al.
2017/0186543 A1* 6/2017 Park ..................... H01G 4/1209
2017/0190626 A1* 7/2017 Yoon ................... C04B 35/4682
2017/0372841 A1 12/2017 Kawamura et al.
2018/0211778 A1 7/2018 Tauchi et al.
2019/0279817 A1* 9/2019 Park ..................... H01G 4/1263
2020/0118751 A1 4/2020 Choi et al.
2020/0194178 A1 6/2020 Choi et al.
2020/0381179 A1* 12/2020 Yoon ........................ H01G 4/30
2021/0043380 A1* 2/2021 Ishibe .................... H01G 4/232
2021/0210288 A1* 7/2021 Kang ................... H01G 4/1245
2021/0304966 A1* 9/2021 Murakami .......... C04B 35/4682
2022/0130608 A1* 4/2022 Mizuno ................ H01G 4/1209
2022/0177371 A1 6/2022 Chung et al.
2023/0147982 A1 5/2023 Kim et al.

FOREIGN PATENT DOCUMENTS

JP 2016-153359 A 8/2016
JP 2018-137286 A 8/2018
JP 2018-139261 A 9/2018
JP 2021-027209 A 2/2021
WO 2024/171939 A1 8/2024

OTHER PUBLICATIONS

Office Action issued Dec. 17, 2025 in U.S. Appl. No. 18/679,359 which has been cross-referenced to the instant application U.S. Patent Publication Nos. 1-6 and Foreign Patent Document No. 1 listed above were cited in that Office Action.
Office Action issued May 6, 2026 in U.S. Appl. No. 18/679,359 which has been cross-referenced to the instant application.

* cited by examiner

DIELECTRIC CERAMIC COMPOSITION AND MULTILAYER CERAMIC ELECTRONIC DEVICE

FIELD

A certain aspect of the present disclosure relates to a dielectric ceramic composition and a multilayer ceramic electronic device.

BACKGROUND

Multilayer ceramic electronic devices such as multilayer ceramic capacitors are used in high frequency communication systems, typified by mobile phones.

PRIOR ART

Patent Document

Document 1: Japanese Patent Application Publication No. 2012-131669

Document 2: Japanese Patent Application Publication No. 2016-153359

SUMMARY OF THE INVENTION

In recent years, the use of multilayer ceramic electronic devices has been expanding, even in electronic circuits related to human life, such as in-vehicle electronic control devices, and high reliability is required, while at the same time, higher mass productivity is required from the perspective of supply.

Dielectric ceramic compositions used in dielectric layers of multilayer ceramic electronic devices have a core made of barium titanate or barium calcium titanate, which is a solid solution of calcium in barium titanate, and a shell containing various additives as a solid solution. A sintered body having a core-shell structure in which a portion surrounds a core portion is used. By adopting this structure, transition to a low temperature of the generation of large electrostatic capacity near the Curie temperature, where barium titanate exists at around 125° C., changing from the ferroelectric phase to the paraelectric phase, is achieved by the effects of various additives in the shell portion. Therefore, it is possible to design a device with a higher electrostatic capacity in a practical temperature range near room temperature.

It is thought that the core-shell structure is produced by solid-solving various additives in barium titanate, barium calcium titanate, or the like. It is thought that the core-shell structure is formed by the reaction of various additives added to barium titanate grains, the main component, in the firing temperature range of, for example, 1000° C. to 1400° C. Generally, as the firing temperature increases, an additive is solid-solved and the shell portion becomes thicker. Therefore, in order to keep the electrostatic capacity of the multilayer ceramic electronic device within the desired range, it is necessary to precisely control the firing temperature.

Furthermore, when using inexpensive base metals such as Ni, Cu, or Sn as the main component for the internal electrodes, it is necessary to perform firing in a reducing atmosphere in order to suppress oxidation of the internal electrodes. At this time, if a large amount of oxygen vacancies occur in grains of barium titanate, barium calcium titanate or the like, the insulation properties will be significantly reduced. Therefore, when producing highly reliable and inexpensive multilayer ceramic electronic devices, the dielectric ceramic composition is required to have anti-reducibility properties.

As an application example of barium titanate without a core-shell structure, there is disclosed a piezoelectric ceramics including at least one of $Ba_4Ti_{12}O_{27}$ or $Ba_6Ti_{17}O_{40}$ as barium titanate composite oxide, and further including 0.04% or more and 0.20% or less by mass of manganese with respect to barium titanate in terms of metal (see, for example, Patent Document 1).

Also, there is disclosed a piezoelectric ceramics containing a metal oxide expressed by $(Ba_{1-x}Ca_x)_a(Ti_{1-y}Zr_y)O_3$ (wherein, $0.09 \le x \le 0.30$, $0.025 \le y \le 0.085$, $0.986 \le a \le 1.020$) and 0.04 parts by weight or more and 0.36 parts by weight or less of manganese in terms of metal per 100 parts by weight of the metal oxide, and contains a metal oxide selected from at least one of $BaTi_2O_5$, $BaTi_4O_9$, $BaTi_5O_{11}$, $BaTi_6O_{13}$, $BaTi_7O_{14}$, $BaTi_8O_{16}$, $Ba_2Ti_5O_{12}$, $Ba_2Ti_6O_{13}$, $Ba_2Ti_9O_{20}$, $Ba_4Ti_{11}O_{26}$, $Ba_4Ti_{13}O_{30}$, $CaTi_2O_4$, $CaTi_2O_5$, $CaTi_4O_9$, $Ca_2Ti_5O_{12}$, $CaZr_4O_9$, $Ca_2Zr_7O_{16}$, $Ca_6Zr_{19}O_{44}$, $CaZrTi_2O_7$, and $Ca_2Zr_5Ti_2O_{16}$ as a barium titanate composite oxide (see, for example, Patent Document 2).

When trying to apply the piezoelectric ceramics disclosed in Patent Document 1 and Patent Document 2 to a dielectric ceramic composition used in the dielectric layer of a multilayer ceramic electronic device, the piezoelectric ceramics disclosed in Patent Document 1 and Patent Document 2, it has been confirmed that the maximum grain size of crystal grains is 2 μm or more, and in the multilayer ceramic electronic device where the thickness of the dielectric layer is 10 μm or less, the number of grain boundaries is reduced and the insulation properties are significantly deteriorated. In addition, the temperature increase rate during firing of the piezoelectric ceramic was at most 10° C./min, making it impossible to achieve the high mass productivity required for multilayer ceramic electronic devices.

In recent years, as the applications of dielectric ceramic compositions and multilayer ceramic electronic devices have expanded, higher mass productivity is required. In order to achieve high mass productivity, shorter firing times and stability of electrostatic capacity against changes in the firing atmosphere are required. For this purpose, it is necessary to suppress changes in electrostatic capacity due to firing temperature and oxygen partial pressure during firing, and to reduce fluctuations in electrostatic capacity due to temperature.

The present invention has been made in view of the above problems, and aims to provide a dielectric ceramic composition and a multilayer ceramic electronic device that suppresses changes in electrostatic capacity due to firing temperature and has high insulation properties in a wide firing atmosphere According to an aspect of the embodiments, there is provided a dielectric ceramic composition including: a first crystal grain that has a perovskite structure expressed by a general formula of $BaCaTiO_3$, and has a core portion and a shell portion surrounding the core portion and including a rare earth element and manganese; and a second crystal grain in which an elemental ratio of total of barium and calcium to titanium is 0.70 or less and a main component is barium calcium titanate.

In the dielectric ceramic composition, the rare earth element may be gadolinium.

In the dielectric ceramic composition, the elemental ratio of the total of barium and calcium to titanium may be 0.926 or more and 0.995 or less, an elemental ratio of gadolinium to titanium may be 0.005 or more and 0.05 or less, and an elemental ratio of manganese to titanium may be 0.002 or more and 0.05 or less.

The dielectric ceramic composition may further include: silicon of which an elemental ratio to titanium is 0.002 or more and 0.05 or less, and magnesium of which an elemental ratio to titanium is 0.00 or more and 0.05 or less.

In the dielectric ceramic composition, a concentration of the rare earth element in the shell portion may be larger than that in the core portion, and a concentration of manganese in the shell portion may be larger than that in the core portion.

In the dielectric ceramic composition, a maximum grain diameter of the first crystal grain may be 2 μm or less.

In the dielectric ceramic composition, an elemental ratio of a total of barium and calcium to titanium in the second crystal grain may be 0.16 or more.

In the dielectric ceramic composition, the second crystal grain may be at least one selected from a group of $BaTi_4O_9$, $BaTi_5O_{11}$, $BaTi_6O_{13}$, $Ba_4Ti_{11}O_{26}$, $Ba_4Ti_{12}O_{27}$, $Ba_4Ti_{13}O_{30}$, or $Ba_6Ti_{17}O_{40}$.

In the dielectric ceramic composition, the second crystal grain may include manganese, and an elemental ratio of manganese to titanium in the second crystal grain may be 0.02 or more and 0.10 or less.

In the dielectric ceramic composition, the second crystal grain may include manganese, and an elemental ratio of manganese to titanium in the second crystal grain may be 0.02 or more and 0.05 or less.

According to another aspect of the embodiments, there is provided a dielectric ceramic composition including: a first crystal grain that has a perovskite structure expressed by a general formula of $BaCaTiO_3$, and has a core portion and a shell portion surrounding the core portion and including a rare earth element and manganese; and a second crystal grain which is barium titanate composite oxide in which an elemental ratio of total of barium and calcium to the barium titanate composite oxide is smaller than an elemental ratio of titanium to the barium titanate composite oxide, wherein the second crystal grain includes manganese and has an elemental ratio of manganese to titanium of 0.02 or more and 0.10 or less.

In the dielectric ceramic composition, the barium titanate composite oxide may be at least one selected from a group of $BaTi_4O_9$, $BaTi_5O_{11}$, $BaTi_6O_{13}$, $Ba_4Ti_{11}O_{26}$, $Ba_4Ti_{12}O_{27}$, $Ba_4Ti_{13}O_{30}$, or $Ba_6Ti_{17}O_{40}$.

In the dielectric ceramic composition, the rare earth element may be gadolinium.

In the dielectric ceramic composition, an elemental ratio of the total of barium and calcium to titanium may be 0.926 or more and 0.995 or less, an elemental ratio of gadolinium to titanium may be 0.005 or more and 0.05 or less, and an elemental ratio of manganese to titanium may be 0.002 or more and 0.05 or less.

The dielectric ceramic composition may further include: silicon of which an elemental ratio to titanium is 0.002 or more and 0.05 or less, and magnesium of which an elemental ratio to titanium is 0.00 or more and 0.05 or less.

In the dielectric ceramic composition, a concentration of the rare earth element in the shell portion may be larger than that in the core portion, and a concentration of manganese in the shell portion may be larger than that in the core portion.

In the dielectric ceramic composition, a maximum grain diameter of the first crystal grain may be 2 μm or less.

In the dielectric ceramic composition, an elemental ratio of manganese to titanium in the second crystal grain may be 0.02 or more and 0.05 or less.

According to another aspect of the embodiments, there is provided a multilayer ceramic electronic device including: the dielectric ceramic composition mentioned above.

The multilayer ceramic electronic device may further include: a plurality of internal electrode layers; a dielectric layer that is sandwiched by the plurality of internal electrode layers and includes the dielectric ceramic composition as claimed in claim 1; and an external electrode that is electrically connected to the plurality of internal electrode layers.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DETAILED DESCRIPTION

Hereinafter, an exemplary embodiment will be described with reference to the accompanying drawings.

Figure 1:
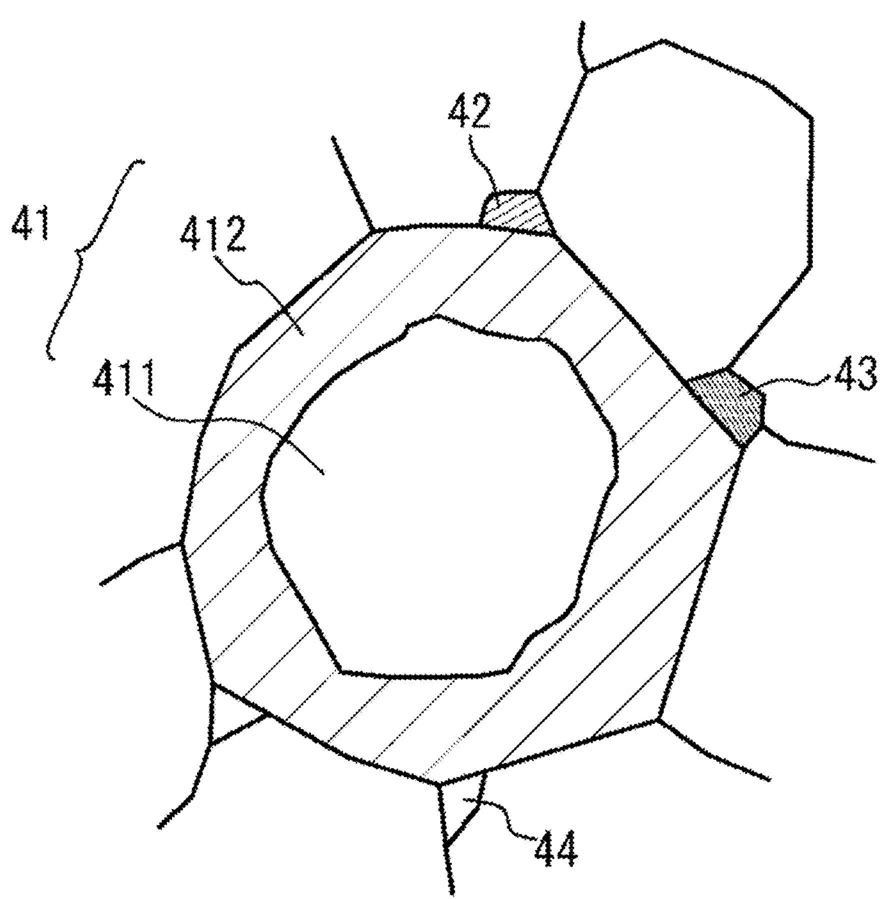
FIG. 1 is a dielectric ceramic composition of a first embodiment.

(First embodiment) A dielectric ceramic composition according to a first embodiment is a ceramic polycrystalline body containing crystal grains having a perovskite structure represented by the general formula $ABO_3$, as illustrated in FIG. 1. At least one of these ceramic polycrystalline is a first crystal grain 41 having a core-shell structure, and at least another one is a second crystal grain 42 having a total element ratio of barium and calcium to titanium of 0.70 or less.

The first crystal grain 41 includes a substantially spherical core portion 411 and a shell portion 412 that surrounds and covers the core portion 411. The core portion 411 is a crystalline portion in which the additive compound is not dissolved in solid solution or the amount of the additive compound in solid solution is small. The shell portion 412 is a crystalline portion in which the additive compound is solid-solved and has a higher concentration of the additive compound than the concentration of the additive compound in the core portion 411. In this embodiment, the shell portion 412 contains a rare earth element and manganese. The rare earth element includes, but is not limited to, gadolinium or the like. For example, the elemental concentration of the rare earth element in the shell portion 412 is higher than the elemental concentration of the rare earth element in the core portion 411. For example, the elemental concentration of manganese in the shell portion 412 is higher than the elemental concentration of manganese in the core portion 411.

By including the first crystal grain 41 and the second crystal grain 42, the dielectric ceramic composition according to the present embodiment suppresses changes in electrostatic capacity due to firing temperature and has high insulation properties in a wide firing atmosphere.

For example, when observing a cross section of the dielectric ceramic composition in a field of view where 400 or more of the first crystal grains 41 and the second crystal grains 42 are observed in total, the area ratio of the first crystal grains 41 is 50% or more and 99.95% or less, and the area ratio of the second crystal grain 42 is 0.05% or more and 50% or less.

Note that, in addition to the first crystal grain 41 and the second crystal grain 42, the dielectric ceramic composition may also include a third crystal grain 43 having a different composition or crystal structure from the first crystal grain 41 and the second crystal grain 42, a void 44, and the like. For example, when observing the cross section of the dielectric ceramic composition in a field of view in which a total of 400 or more of the first crystal grains 41, the second crystal grains 42, and the third crystal grains 43 are observed, the area ratio of the third crystal grains 43 is 0.05% or more and 20% or less.

Figure 2:
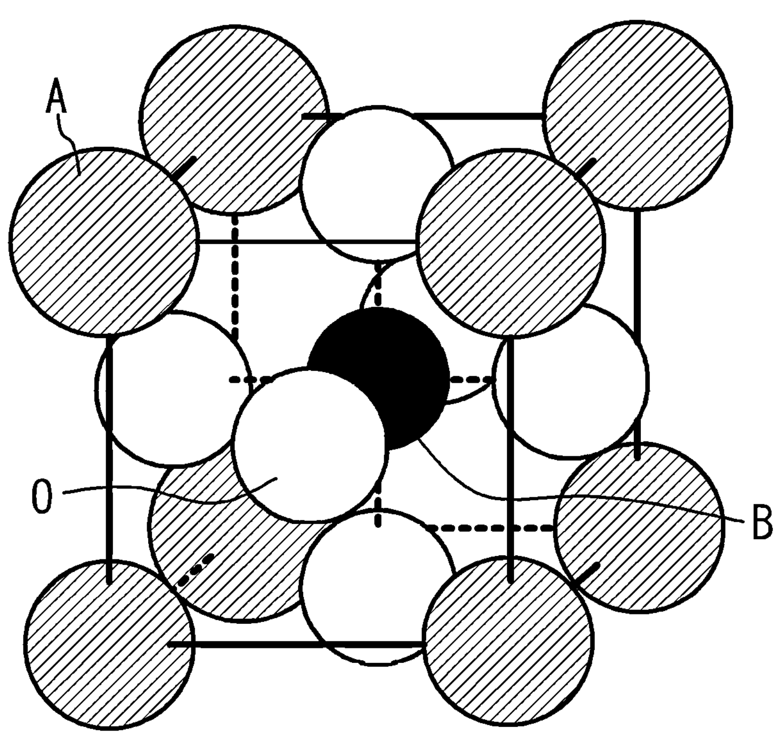
FIG. 2 illustrates a unit lattice.

Crystal grains having a perovskite structure, which are the main components of the first crystal grains 41, have a unit cell as illustrated in FIG. 2. This unit cell has an A site located at the apex of the lattice, an O site located at the face center of the lattice, and a B site located within an octahedron with the O site as the apex. In the perovskite structure, alkaline earth metals that can take divalent cations such as barium (Ba), strontium (Sr), or calcium (Ca) are located at the A site, and hafnium (Hf) or zirconium (Zr), or titanium (Ti) that can take tetravalent cations are located at the B site.

The perovskite structure also allows a composition formula that deviates from the stoichiometric composition. That is, the ratio of the A-site element to the B-site element does not necessarily have to be 1:1, and defects may be generated within a range where the perovskite structure can be maintained. Furthermore, defects may also be generated regarding oxygen. For example, when the composition formula is $A_{\alpha}BO_{3-\beta}$, compositions in the ranges of $0.98 \leq \alpha \leq 1.01$ and $0 \leq \beta \leq 0.20$ are allowed.

However, due to the generation of oxygen defects, for example, the resistivity decreases and ionic conductivity is exhibited, which reduces the electrical life when used as a multilayer ceramic capacitor and increases the dielectric loss. For this reason, the first crystal grain 41 having a perovskite structure is coated with a first transition element such as scandium (Sc), titanium (Ti), vanadium (V), chromium (Cr), iron (Fe), cobalt (Co), nickel (Ni), copper (Cu), or zinc (Zn) as necessary. This makes it possible to improve resistivity, increase electrical longevity, and reduce dielectric loss due to electrostatic capacity.

In addition, the first crystal grain 41 may include at least one of second transition elements such as yttrium (Y), zirconium (Zr), niobium (Nb), molybdenum (Mo), ruthenium (Ru), rhodium (Rh), palladium (Pd) or silver (Ag). This makes it possible to improve resistivity, increase electrical longevity, and reduce dielectric loss due to electrostatic capacity.

In addition, the first crystal grain 41 may include at least one of third transition elements such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), tantalum (Ta), (W), rhenium (Re), osmium (Os), iridium (Ir), platinum (Pt), or gold (Au). This makes it possible to improve resistivity, increase electrical longevity, and reduce dielectric loss due to capacitance.

For example, in the dielectric ceramic composition, it is preferable to add titanium in an amount of 0.5 mol or more and 8.0 mol or less in terms of titanium oxide ($TiO_2$) per 100 mol of barium calcium so that the (Ba+Ca)/Ti elemental ratio "x", which is the total elemental ratio of barium and calcium to the titanium content, satisfies $0.926 \leq x \leq 0.995$. The solid solution reaction to the barium titanate crystal grains is relatively suppressed compared to the case where no additive containing titanium is added. As an example, this effect can be applied to multilayer ceramic capacitors, which require high mass production, to achieve firing in a shorter time, while also reducing the rate of change in electrostatic capacity caused by changes in firing temperature and oxygen partial pressure during firing. It is therefore possible to achieve high mass productivity.

Even more preferably, it is preferable to add titanium in an amount of 1.5 mol or more and 6.4 mol or less in terms of conversion to titanium oxide ($TiO_2$) with respect to 100 mol of barium calcium titanate, to the dielectric ceramic composition, such that the (Ba+Ca)/Ti elemental ratio "x" satisfies $0.940 \leq x \leq 0.985$. In this case, a sufficient amount of the second crystal grains 42 are generated in the dielectric ceramic composition, and the range of change in electrostatic capacity due to changes in firing temperature and oxygen partial pressure during firing is further suppressed.

Preferred examples of the above titanium-containing additives include titanium oxide. The additive may be such as titanium hydroxide ($Ti(OH)_4$), titanium chloride ($TiCl_4$), titanium carbide (TiC) or titanium sulfide ($TiS_2$) can also be used.

Furthermore, it is preferable to add gadolinium in an amount of 0.25 mol or more and 2.5 mol or less in terms of conversion to gadolinium oxide ($Gd_2O_3$) with respect to 100 mol of barium calcium titanate, to the dielectric ceramic composition, such that the Gd/Ti elemental ratio "y", which is the elemental ratio of gadolinium to the titanium content, satisfies $0.005 \leq y = 0.05$.

In addition to adding gadolinium oxide, it is preferable to add manganese in an amount of 0.2 mol or more and 5.0 mol or less in terms of conversion to manganese oxide (MnO) with respect to 100 mol of barium calcium titanate, to the dielectric ceramic composition, such that the Mn/Ti elemental ratio "z", which is the manganese elemental ratio to the titanium content, satisfies $0.002 \leq z \leq 0.05$.

For example, when $0.926 \leq x \leq 0.995$, $0.005 \leq y \leq 0.05$, and $0.002 \leq z \leq 0.05$ are satisfied, the added gadolinium, manganese, and titanium react on the surface of barium calcium titanate crystal grains, and can be produced as a shell portion in the form of a complex perovskite compound considered to be $Gd(Ti,Mn)O_3$. As a result, the dielectric ceramic composition not only suppresses the range of change in electrostatic capacity due to changes in firing temperature, but also suppresses the movement of oxygen defects within the grain boundaries and shell portion, resulting in a decrease in resistivity and improvement of electrical life.

Even more preferably, it is desirable to adjust the amount of gadolinium and the amount of manganese so that $0.005 \leq y \leq 0.02$ and $0.005 \leq z \leq 0.02$ are satisfied. In this case, in the dielectric ceramic composition, excessive solid solution of gadolinium into crystal grains made of barium calcium titanate, precipitation of excessive manganese on the surface of the dielectric ceramic composition and so on can be achieved. This makes it possible to further suppress the range of change in electrostatic capacity due to changes in firing temperature and oxygen partial pressure, and to maintain high resistivity.

In the dielectric ceramic composition, in addition to additives containing gadolinium, manganese, and titanium, it may be preferable to add silicon an amount of 0.2 mol or more and 5.0 mol or less in terms of conversion to silicon oxide ($SiO_2$) with respect to 100 mol of barium calcium titanate, to the dielectric ceramic composition, such that the Si/Ti elemental ratio “a”, which is the silicon elemental ratio to the titanium content, satisfies $0.002 \leq a \leq 0.05$. It may be preferable to add magnesium an amount of 0 mol or more and 5.0 mol or less in terms of conversion to magnesium oxide (MgO) with respect to 100 mol of barium calcium titanate, to the dielectric ceramic composition, such that the Mg/Ti elemental ratio “b”, which is the magnesium elemental ratio to the titanium content, satisfies $0.00 \leq b \leq 0.05$. In this case, the first crystal grain 41 containing silicon or the second crystal grain 42 that become glass grains are generated in the dielectric ceramic composition, and a liquid phase of the first crystal grain 41 and the second crystal grain 42 are generated inside during firing. Therefore, it is possible to obtain a denser ceramic at a lower temperature. In addition, by adding magnesium oxide, it becomes possible to generate a shell portion in the form of $Gd(Mg, Ti, Mn)O_3$ or $(Gd, Ca, Ba)(Mg, Ti, Mn)O_3$, and becomes possible to further suppress the movement of oxygen defects within the grain boundaries and the shell portion, thereby suppressing a decrease in resistivity.

Even more preferably, it is desirable that $0.005 \leq a \leq 0.02$ is satisfied and $0.002 \leq b \leq 0.02$ is satisfied. In this case, it is possible to suppress excessive additives from being generated as the third crystal grain 43, and while suppressing a decrease in relative dielectric constant, achieving the effect of densification at low temperature and suppression of decrease in resistivity.

Among the first transition metal element, second transition metal element, and third transition metal element, cerium, praseodymium, neodymium, samarium, europium, gadolinium, terbium, dysprosium, holmium, erbium, thulium, ytterbium, and lutetium acting as a rare earth element is used as an additive. In this case, the rare earth element is solid-solved from the interface to the inside of the first crystal grain 41 in the firing temperature range of 1000° C. to 1400° C. to obtain a dielectric ceramic composition. It is possible to obtain a crystal grain having the core-shell structure in which the shell portion 412 and the core portion 411 are formed.

By the way, in the core-shell structure, generally, as the firing temperature increases, more of various additives are solid-solved in the crystal grain made of barium calcium titanate, and the shell portion tends to become thicker. In the shell portion, the large electrostatic capacity range near 125° C., which is near the Curie temperature of barium calcium titanate, approaches room temperature. As a result, the electrostatic capacity in the practical temperature range near room temperature changes greatly depending on the thickness of the shell portion. Therefore, for example, in order to keep the electrostatic capacity of a multilayer ceramic capacitor within a desired range, it is preferable to precisely control the firing temperature.

For example, the dielectric ceramic composition according to the present embodiment can be obtained by firing at a temperature of 1,000° C. to 1,300° C., and raising the temperature rapidly during the firing process from 3,000° C./h to 10,000° C./h.

The first crystal grain 41 having the core-shell structure in which the shell portion 412 containing the rare earth element and manganese is formed has a production process different from that of a conventional core-shell structure. Specifically, in addition to solid solution of the rare earth element in the barium titanate crystal grains, the added rare earth element, manganese, and titanium react on the surface of the barium titanate crystal grains, and the shell portion is formed in a composite perovskite compound such as $Gd(Ti, Mn)O_3$.

Furthermore, in the shell portion 412, magnesium added reacts on the surface of the barium titanate crystal grains and is formed as a shell portion in the form of a composite perovskite compound such as $Gd(Mg,Ti,Mn)O_3$.

The shell portion 412 in the form of a composite perovskite compound considered to be $Gd(Ti,Mn)O_3$ or $Gd(Mg, Ti,Mn)O_3$ reacts with the surrounding barium calcium titanate crystal particles, which is the main component. Thereby, the shell portion 412 may be produced as $(Gd, Ca, Ba) (Ti, Mn)O_3$ or $(Gd, Ca, Ba) (Mg, Ti, Mn)O_3$.

For example, the core portion 411 in the core-shell structure is mainly composed of crystal grains made of barium calcium titanate, but may also contain added rare earth elements, manganese, magnesium or the like. For example, it is sufficient that the shell portion 412 contains relatively more rare earth elements, manganese, magnesium or the like among the additives than the core portion 411.

More specifically, crystal grains with the core-shell structure in which a shell containing the rare earth element and manganese is formed with crystal grains mainly composed of barium calcium titanate contains the rare earth element or manganese in a relatively large amount compared to the elemental ratio of titanium in the central portion at any point in the range where a distance from the surface toward the center is within 10% of the diameter of the corresponding crystal grain. Due to the presence of crystal grains with such a core-shell structure, the polycrystalline body constituting the dielectric ceramic composition not only suppresses the range of change in electrostatic capacity due to changes in firing temperature, but also suppresses but also suppresses oxygen vacancies. It is possible to suppress the movement of oxygen vacancies within the grain boundaries and the shell portion, to suppress a decrease in resistivity, and to improve the electrical life.

Note that the average grain diameter of the first crystal grains 41 in the dielectric ceramic composition is within the range of 50 nm to 500 nm, and giant grains of 3 μm or more are not retained in the section where they are electrically utilized as a dielectric. For example, in the dielectric ceramic composition, the maximum grain diameter of the first crystal grains 41 is preferably 2 μm or less. In view of the general characteristic of ceramics that the grain diameter and composition distribution of the crystal grains contained fall within a relatively narrow range, when it is confirmed that the first crystal grains 41 have a core-shell structure, it can be said that the presence of a large number of the first crystal grains 41 having a similar structure has a positive effect on the electrical life of the dielectric ceramic composition.

The grain diameter of the first crystal grain 41 can be measured by the following procedure. The dielectric ceramic composition having the first crystal grain 41 is cut or polished to expose the observation surface. This exposure method is not particularly limited, and a method of cutting or polishing the element can be adopted. At this time, in order to fully observe the internal ceramic structure, it is preferable to finally use diamond paste or the like with a thickness of 2 μm or less to obtain a smoothness that can be considered as a mirror surface. Next, after depositing a conductive substance such as platinum or osmium on the observation surface, observation is performed using a scanning electron microscope (SEM), and a photograph of the first crystal grain 41 is taken. Next, a plurality of mutually parallel straight lines are drawn in the photographed photograph, and the length of the line segment cut by cutting each straight line at the periphery of each of the first crystal grains 41 (the distance between two points where each straight line intersects with the periphery of the first crystal grain 41) is defined as the grain diameter (grain size) of the first crystal grains 41. Using this method, the grain size of the first crystal grains 41 is measured for 400 or more grains, and the average of the obtained results is taken as the average grain size of the first crystal grains 41. In addition, if the outline of the first crystal grains 41 is difficult to see in the exposed ceramic, it is preferable that, prior to vapor deposition of platinum or osmium or the like, heat treatment (thermal etching) is performed on the exposed ceramic for about 5 minutes at a temperature about 50° C. lower than the firing temperature. Instead of this heat treatment, it is also possible to chemically etch using hydrofluoric acid, hydrochloric acid, sulfuric acid, nitric acid, or a mixture thereof at an appropriate concentration for etching.

The core-shell structure of the first crystal grain 41 is formed by adding gadolinium, manganese, and titanium reacting on the surface of barium titanate crystal grains, and forming the shell portion 412 in the form of a complex perovskite compound that is considered to be $Gd(Ti,Mn)O_3$ or in the form of $Gd(Mg, Ti, Mn)O_3$, $(Gd, Ba, Ca)(Ti, Mn)O_3$, or $(Gd, Ba, Ca)(Mg, Ti, Mn)O_3$. At this time, since the added titanium is involved in the reaction, the solid solution reaction to the barium titanate crystal grains is relatively suppressed compared to the case where titanium is not added. By applying this effect to multilayer ceramic capacitors, which require high mass production, for example, it is possible to achieve firing in a shorter time while reducing electrostatic capacity due to changes in firing temperature and oxygen partial pressure and suppressing the variation range and obtaining high mass productivity.

Here, the presence of the first crystal grains 41 having the core-shell structure in the dielectric ceramic composition can be confirmed by the following procedure. In addition, in the following procedure, the case where gadolinium is used as the rare earth element is explained as an example.

First, a sample for transmission electron microscopy (TEM) observation is cut out from the dielectric ceramic composition to be confirmed. This cutting out can be performed using a focused ion beam (FIB) device or the like.

Next, the cut sample for TEM observation is observed with a TEM equipped with an energy dispersive X-ray spectrometer (EDS) or a wavelength dispersive X-ray spectrometer (WDS) to determine the crystal grains to be measured. At the same time, the outer circumferential shape of the particle is specified.

Figure 3:
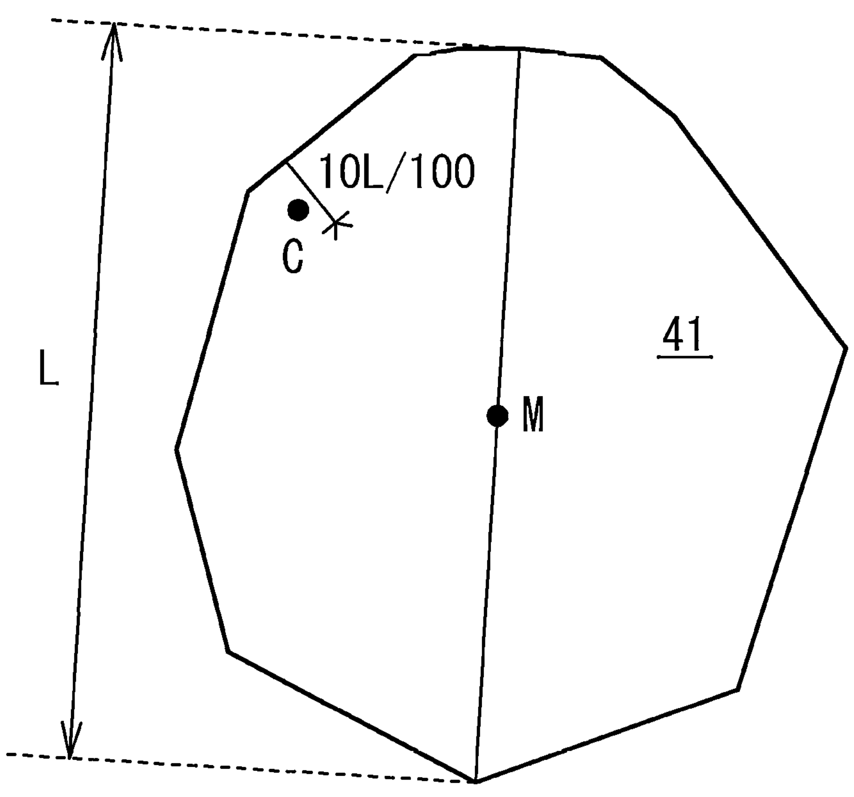
FIG. 3 illustrates a confirming method of a core-shell structure.

Next, as illustrated in FIG. 3, among the line segments connecting arbitrary two points located on the outer periphery of the crystal grain to be measured (first crystal grain 41), the one with the maximum length is determined, and the length L of the line segment is determined. Then, this length L is taken as the diameter of the crystal grain to be measured. Furthermore, the midpoint M of the line segment is determined from the obtained length of the line segment.

A composition analysis using EDS or WDS on any point C on the outer periphery within a length range of 10% of the diameter of the crystal grain, that is, 10 L/100, from both ends of the above line segment is performed, and the element abundance ratio between the element and the titanium element is calculated. In the compositional analysis, for example, in EDS measurements, it is simply determined by the K-line intensity of titanium relative to the K-line or L-line of barium, the K-line of calcium, the L-line of gadolinium, the K-line of manganese, and the K-line of magnesium. More specifically, from these intensities, a correction (ZAF correction) is performed that takes into account the atomic number effect, absorption effect, and fluorescence excitation effect, and the ratio of each to the elemental content of titanium is calculated. Furthermore, composition analysis is similarly performed for the midpoint M of the above line segment to calculate the ratio, and this is taken as the ratio of each element to titanium in the core portion 411.

Next, the ratio of each element to titanium in the shell portion 412 and the ratio of each element to titanium in the core portion 411 are compared. And when the ratio of the shell portion 412 is higher than that of the core portion 411, the first crystal grain 41 has a core-shell structure.

In addition to the first crystal grain 41, the dielectric ceramic composition contains barium calcium titanate as a main component as the second crystal grain 42 other than the first crystal grain 41, and contains at least one of the second crystal grains 42 in which the elemental ratio of the total of barium and calcium to titanium is 0.70 or less.

In the second crystal grain 42, the elemental ratio of the total of barium and calcium to titanium is preferably 0.16 or more. Further, the second crystal grain 42 may contain manganese. The elemental ratio of manganese to titanium in the second crystal grain 42 may be 0.02 or more and 0.10 or less, or 0.02 or more and 0.05 or less.

Examples of the second crystal grain 42 is such as $BaTi_4O_9$, $BaTi_5O_{11}$, $BaTi_6O_{13}$, $Ba_4Ti_{11}O_{26}$, $Ba_4Ti_{12}O_{27}$, $Ba_4Ti_{13}O_{30}$, $Ba_6Ti_{17}O_{40}$, or the like.

As is clear from its compositional formula, the second crystal grains 42 are barium titanate composite oxides having a lower total element ratio of barium and calcium than titanium. As described above, in the dielectric ceramic composition according to the present embodiment, the second crystal grains 42 are formed in the form of complex perovskite compound which are considered as $Gd(Ti,Mn)O_3$, $Gd(Mg,Ti,Mn)O_3$, $(Gd,Ca,Ba)(Mg, Ti,Mn)O_3$ or $(Gd,Ca,Ba)(Mg,Ti,Mn)O_3$. Therefore, when an additive containing titanium as a main component is used as the additive, a crystal grain is produced as a secondary product. The first crystal grains 41 are obtained by intentionally precipitating the second crystal grain 42. For example, in a multilayer ceramic capacitor for which high mass productivity is required, it is possible to suppress the range of change in electrostatic capacity due to a change in firing temperature and obtain high mass productivity. Further, regarding the dielectric ceramic composition according to the present embodiment including the second crystal grain 42, firing at a relatively high temperature is required in order to form the shell portion 412 in the form of the composite perovskite compound described above. If firing is performed at a temperature increase rate of at most 10° C./min (600° C./h) as disclosed in Patent Document 1 and Patent Document 2, the second crystal grains 42 will grow large and it is confirmed that huge grains exceeding 10 μm is generated. In order to eliminate this, it is preferable that the temperature of the dielectric ceramic composition according to the present embodiment is rapidly increased to 3000° C./h to 10000° C./h, and the thermal energy added to the firing process is minimized, and the grain growth is suppressed.

A more preferable example of the second crystal grains 42 is $Ba_4Ti_{11}O_{26}$, which is monoclinic barium titanate composite oxide and has a space group C2/m, and has lattice constants a=15.160 Å, b=3.893 Å, and c=9.093 Å, and β=98.6°. This is because the barium titanate composite oxide has a ratio of barium to titanium that is relatively close to 3, and can be easily precipitated intentionally without using a large amount of additives whose main component is titanium. The barium titanate composite oxide is described, for example, in the non-patent literature Acta Cryst. (1979). B35, 1590-1593.

As a more preferable example of the second crystal grains 42, it is desirable that manganese is solid-solved in $Ba_4Ti_{11}O_{26}$ and occupies the defect sites thereof, or that some titanium is replaced by manganese. As is clear from the above-mentioned non-patent literature, $Ba_4Ti_{11}O_{26}$ has a crystal structure in which some titanium sites have defects. Therefore, titanium tends to change from a tetravalent cation to a trivalent cation at the defect location, and as a result, the resistivity tends to decrease. In order to supplement this, it is effective to include manganese in solid solution.

Here, it can be confirmed that the dielectric ceramic composition contains the second crystal grain 42 by the following procedure.

First, the diffraction ray profile of the surface of the dielectric ceramic composition to be confirmed or the powder obtained by crushing the dielectric ceramic composition is measured using an X-ray diffractometer (XRD) using Cu-Kα rays. The pulverizing means for obtaining the powder is not particularly limited, and a hand mill (mortar/pestle) or the like can be used. In addition, when measuring the diffraction profile of the ceramics that make up the multilayer ceramic capacitor, the electrodes and coatings formed on the surface of the element, as well as the parts other than the dielectric layer of the multilayer ceramic capacitor are removed and the surface of the dielectric ceramic composition is exposed. This exposure method is not particularly limited, and a method of cutting or polishing the element can be adopted. In addition, when measuring the diffraction ray profile of the powder of the dielectric ceramic composition that constitutes the multilayer ceramic capacitor, it is preferable to perform the crushing after removing the electrodes and coatings formed on the element, as well as other parts of the multilayer ceramic capacitor other than the dielectric layer.

Next, in the obtained diffraction ray profile, the percentage of the strongest diffraction ray intensity in the diffraction profile derived from other structures with respect to the strongest diffraction ray intensity in the profile derived from the perovskite structure is calculated. If this ratio is 10% or less, it is determined that the dielectric ceramic composition to be confirmed is composed of the first crystal grains 41 having a perovskite structure. In addition, when the surface of the dielectric ceramic composition of a multilayer ceramic capacitor is exposed using the above method, or when XRD measurement is performed on pulverized powder, peaks of the materials constituting the electrodes and coatings are also detected. Therefore, the above-mentioned ratio of diffraction ray intensity is calculated after removing this.

Next, we will identify the crystal phase by focusing on peaks other than the diffraction line intensity derived from the perovskite structure. It is preferable to identify the crystal phase by searching a PDF (Powder Diffraction File) published by ICDD (International Center for Diffraction Data; Pennsylvania, USA) and searching to see if it contains the second crystal grains 42. Regarding $Ba_4Ti_{11}O_{26}$ as a preferred example, its production can be evaluated by identifying it with reference to PDF-01-083-1459.

Next, it is determined by the following method that the second crystal grain 42 is made of a barium titanate composite oxide in which the elemental ratio of the total of barium and calcium to titanium is 0.70 or less.

First, the surface of the dielectric ceramic composition is exposed. This exposure method is not particularly limited, and a method of cutting or polishing the element can be adopted. In this case, in order to fully observe the internal ceramic structure, it is preferable to finally obtain a smoothness that can be judged as a mirror surface by using a diamond paste or the like with a thickness of 2 μm or less.

Next, the composition of the second crystal grains 42 is identified by an energy dispersive X-ray spectrometer (EDS) or an X-ray spectrometer (WDS: Wavelength Dispersive X-ray Spectrometry) attached to a scanning electron microscope (SEM) or a transmission electron microscope (TEM), an electron probe micro analyzer (EPMA), a laser irradiation inductively coupled plasma mass spectrometry (LA-ICP-MS), or the like.

For example, in EDS measurement, specifying is performed by the K-line intensity of titanium relative to the K-line or L-line of barium or the K-line of manganese. More specifically, from these intensities, a correction (ZAF correction) is performed that takes into account the atomic number effect, absorption effect, and fluorescence excitation effect, and the ratio of each to the elemental content of titanium is calculated, and the ratio of each element is calculated.

When performing EDS measurements, especially when using barium's Lα line and titanium's Kα line, their energy peaks are close to each other, and it may be difficult to adequately compare the element contents. For this reason, it is desirable that the Lβ2 line and LIIIab line of barium be obtained with sufficient intensity without peak overlap during measurement. Specifically, it is desirable that the intensity at the peak is 10,000 counts or more. At this time, the intensity of the characteristic X-rays from barium can be determined and the element content can be calculated, so even if the Lα lines of barium and the Kα lines of Ti overlap, the intensity of the Kα lines of titanium can be determined, and the element content can be evaluated with high accuracy.

When the elemental ratio of barium to titanium obtained by the above method is 0.70 or less, the crystal grain is determined to be the second crystal grain 42. That is, it is determined that it is one of the above-mentioned barium titanate composite oxides based on the fact that the elemental ratio of barium to titanium is small compared to the first crystal grains 41 made of barium titanate existing in the surroundings. At this time, if a SEM is used for the observation, the second crystal grains 42 are characterized by having relatively low brightness and being observed darkly compared to the first crystal grains 41, in observation using a back scattered electron image (BSE image). Moreover, as a more suitable judgment, it is desirable that the second crystal grains 42 be identified by evaluating the diffraction profile by XRD.

Next, in more detail, the part determined to be the second crystal grain 42 is cut out as a sample for transmission electron microscopy (TEM) observation. It is determined whether to confirm as $BaTi_4O_9$, $BaTi_5O_{11}$, $BaTi_6O_{13}$, $Ba_4Ti_{11}O_{26}$, $Ba_4Ti_{12}O_{27}$, $Ba_4Ti_{13}O_{30}$, or $Ba_6Ti_{17}O_{40}$ by comparing a diffraction image obtained using selected area diffraction method with data known literature. Note that this cut out can be performed using an FIB device or the like.

The solid solution of manganese in the second crystal grains 42 can be confirmed by the intensity of the titanium K line relative to the Mn K line by EDS, WDS, or EPMA. More specifically, from these intensities, ZAF correction is performed to calculate the ratio "w" of the elemental content of manganese to the elemental content of titanium. At this time, it is desirable that the range is $0.02 \leq w \leq 0.10$, more preferably $0.02 \leq w \leq 0.05$. At this time, for example, manganese becomes a solid solution in the defect position of the Ti site in $Ba_4Ti_{11}O_{26}$, and a decrease in resistivity of the dielectric ceramic composition can be suppressed.

Furthermore, the dielectric ceramic composition may contain the third crystal grain 43 having a different composition or crystal structure from the first crystal grain 41 and the second crystal grain 42. Further, the dielectric ceramic composition may contain a silicon-containing crystal grain or a glass grain. This makes it possible to sufficiently densify the dielectric ceramic composition by firing it at 1300° C. or lower.

As the third crystal grain 43, a crystal grain or a glass grain such as silicate ($SiO_2$), enstatate ($MgSiO_3$), barium magnesium silicate ($BaMgSiO_4$), or fresnoite ($Ba_2TiSi_2O_8$) are generally used.

In addition, the third crystal grain 43 is such as a sub-compound derived from added substances such as geykeylite ($MgTiO_3$), manganese nickel oxide ((Mn, Ni)O), or pyrophanite ($MnTiO_3$), or derived from electrodes.

(Second Embodiment) In a second embodiment, a multilayer ceramic capacitor 100 using the dielectric ceramic composition of the first embodiment will be described.

Figure 4:
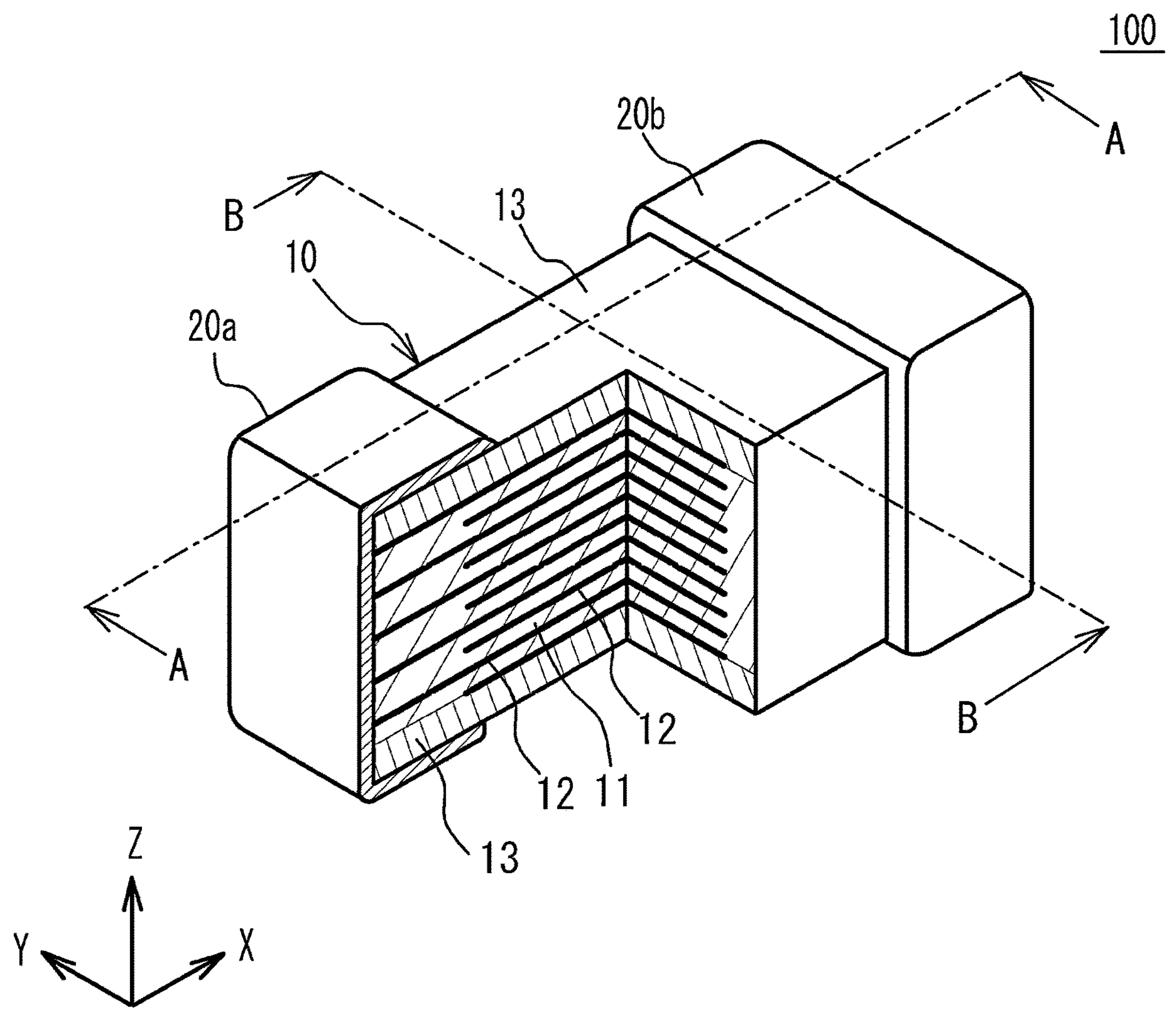
FIG. 4 is a partial cross-sectional perspective view of a multilayer ceramic capacitor.
Figure 5:
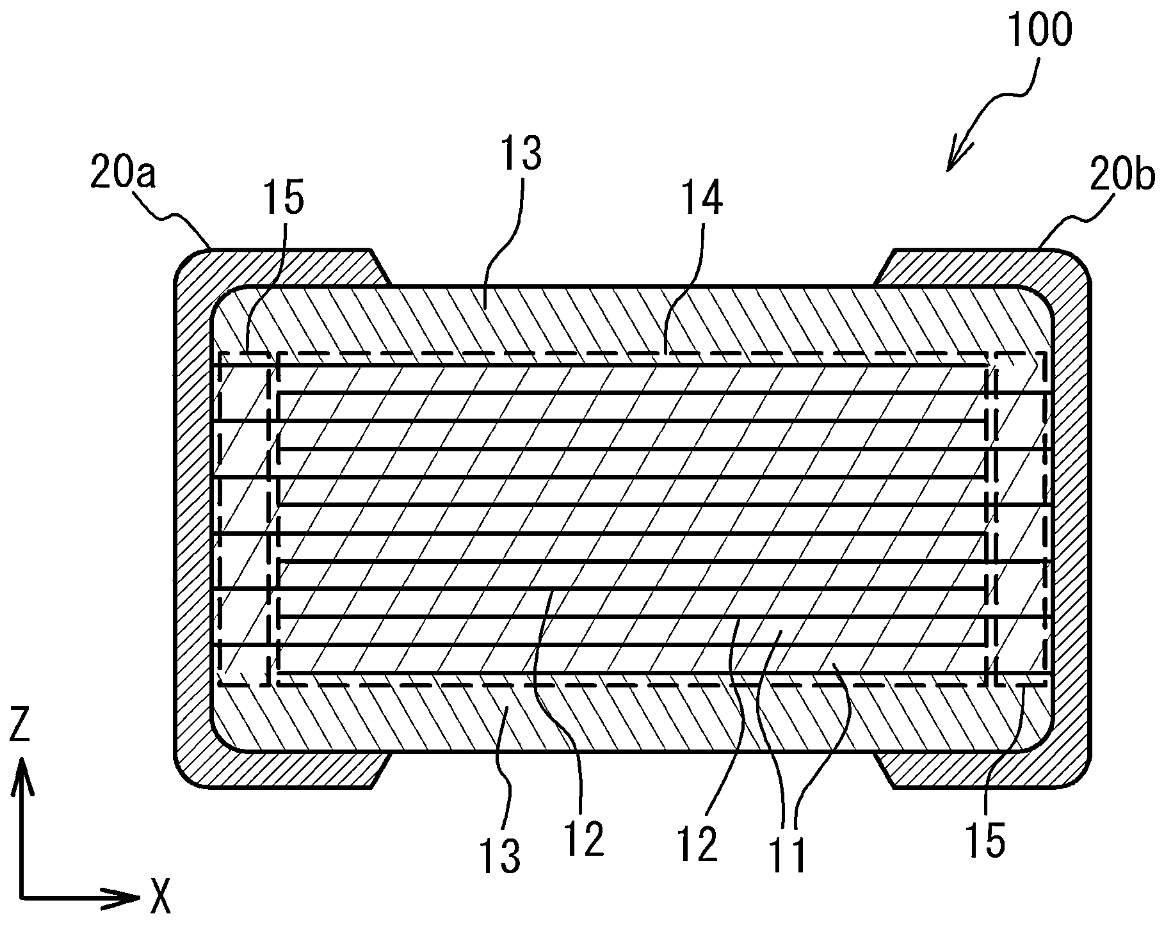
FIG. 5 is a cross-sectional view taken along line A-A in FIG. 4.
Figure 6:
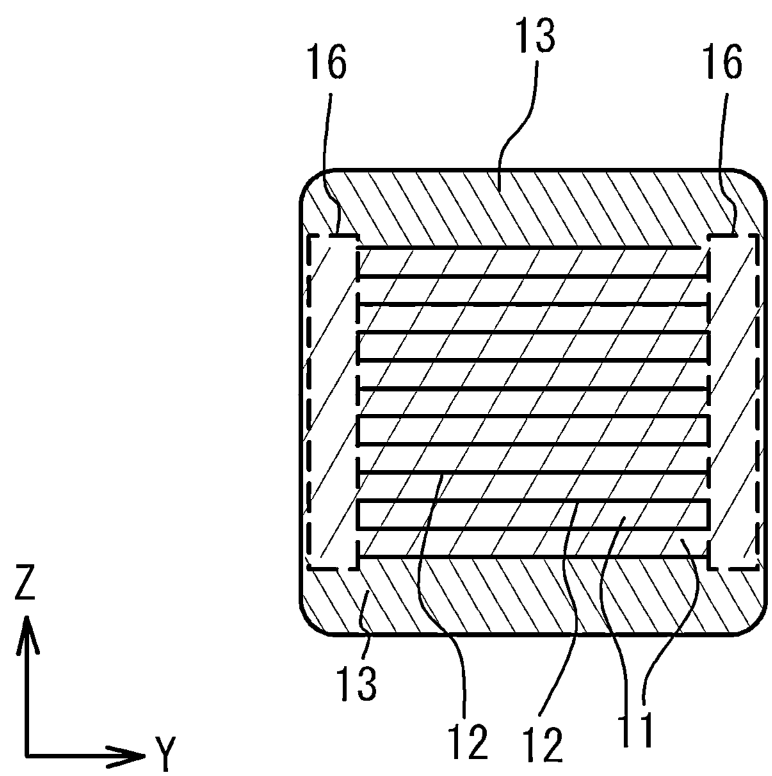
FIG. 6 is a cross-sectional view taken along line B-B in FIG. 4.

FIG. 4 illustrates a perspective view of the multilayer ceramic capacitor 100, in which a cross section of a part of the multilayer ceramic capacitor 100 is illustrated. FIG. 5 is a cross-sectional view taken along line A-A in FIG. 4. FIG. 6 is a cross-sectional view taken along line B-B in FIG. 4. As illustrated in FIG. 4 to FIG. 6, the multilayer ceramic capacitor 100 includes a multilayer chip 10 having a rectangular parallelepiped shape, and external electrodes 20*a* and 20*b* that are respectively provided on two end faces of the multilayer chip 10 opposite to each other. Among four faces other than the two end faces of the multilayer chip 10, two faces other than the top face and the bottom face in the stack direction are referred to as side faces. Each of the external electrodes 20*a* and 20*b* extends to the top face and the bottom face in the stack direction and the two side faces of the multilayer chip 10. However, the external electrodes 20*a* and 20*b* are spaced from each other.

The multilayer chip 10 has a structure in which dielectric layers 11 containing the dielectric ceramic composition and internal electrode layers 12 mainly composed of a base metal are alternately stacked. In other words, the multilayer chip 10 includes the internal electrode layers 12 facing each other and the dielectric layers 11 sandwiched between the internal electrode layers 12. The edges in the direction in which each internal electrode layer 12 extends are alternately exposed at a first end face provided with the external electrode 20*a* of the multilayer chip 10 and a second end face provided with the external electrode 20*b*. Thus, the internal electrode layers 12 are alternately electrically connected to the external electrode 20*a* and the external electrode 20*b*. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 may be the same as the main component of the dielectric layer 11 or may be different from the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them.

As illustrated in FIG. 5, the section where the internal electrode layer 12 connected to the external electrode 20*a* faces the internal electrode layer 12 connected to the external electrode 20*b* is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20*a* face each other with no internal electrode layer 12 connected to the external electrode 20*b* interposed therebetween is referred to as an end margin section 15. The section where the internal electrode layers 12 connected to the external electrode 20*b* face each other with no internal electrode layer 12 connected to the external electrode 20*a* interposed therebetween is another end margin section 15. That is, the end margin section 15 is a section where the internal electrode layers 12 connected to one of the external electrodes face each other with no internal electrode layer 12 connected to the other of the external electrodes interposed therebetween. The end margin section 15 is a section where no capacity is generated.

As illustrated in FIG. 6, in the multilayer chip 10, a section from one of the two side faces of the multilayer chip 10 to lateral side edges of the internal electrode layers 12 is referred to as a side margin section 16. That is, each of the side margin sections 16 is a section that covers the lateral side edges, extending toward one of the side faces of the multilayer structure, of the stacked internal electrode layers 12. The side margin section 16 is a section where no capacity is generated.

In the multilayer ceramic capacitor 100 according to the present embodiment, at least a portion of the dielectric layer 11 in the capacity section 14 includes the first crystal grain 41 illustrated in FIG. 1 and also includes the second crystal grain 42. Thereby, changes in electrostatic capacity due to firing temperature can be suppressed, and insulation can be increased in a wide firing atmosphere. As a result, it becomes possible to obtain high mass productivity.

Figure 7:
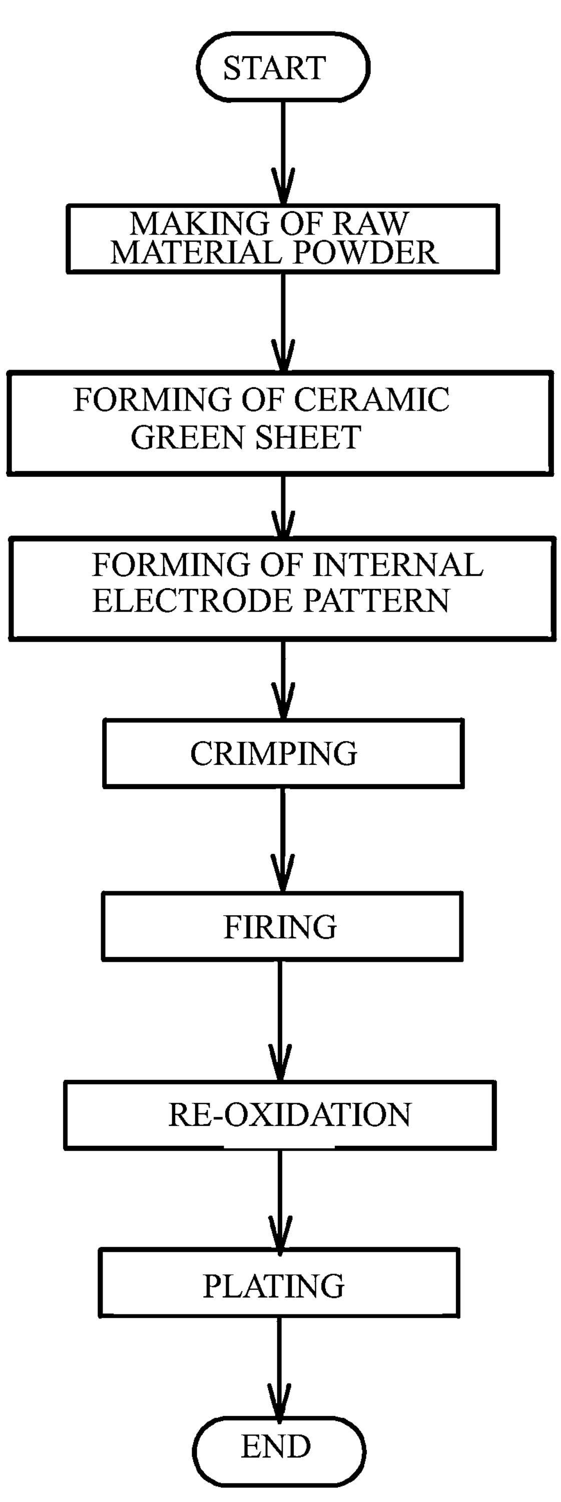
FIG. 7 illustrates a flow of a manufacturing method of a multilayer ceramic capacitor.

Next, a description will be given of a manufacturing method of the multilayer ceramic capacitors 100. FIG. 7 illustrates a manufacturing method of the multilayer ceramic capacitor 100.

(Making process of raw material powder) The dielectric ceramic composition for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. As an example, the additive of the dielectric ceramic composition of the first embodiment is used. If necessary, an oxide or a glass containing Zr (zirconium), V (vanadium), Cr (chromium), Co (cobalt), Ni (nickel), Li (lithium), B (boron), Na (sodium), K (potassium) may also be used. If necessary, an oxide of a rare earth element other than dysprosium such as Sc (scandium), Y (yttrium), La (lanthanum), Ce (cerium), Pr (praseodymium), Nd (neodymium), Pm (promethium), Sm (samarium), Tb (terbium), Dy (dysprosium), Ho (holmium), Er (erbium), Tm (thulium), Y (ytterbium), and Lu (lutetium) may be added.

For example, a compound containing an additive compound is wet-mixed with barium titanate powder, dried and pulverized to prepare a ceramic material in which barium titanate powder and the additive compound are mixed. For example, the ceramic material obtained as described above may be pulverized to adjust the particle size, if necessary, or may be combined with a classification process to adjust the particle size. Specifically, the particles are stirred for 10 to 100 hours with ceramic materials and beads with a diameter of 0.1 mm to 3 mm made of yttrium stabilized zirconia (YSZ), alumina, silicon nitride or the like. Thus, the diameter of the particles can be adjusted. Through the above process, a dielectric ceramic composition is obtained.

(Forming of dielectric green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 51 is painted on a base material by, for example, a die coater method or a doctor blade method, and then dried. The base material is, for example, PET (polyethylene terephthalate) film. Figures of forming of the dielectric green sheet is omitted.

Figure 8A:
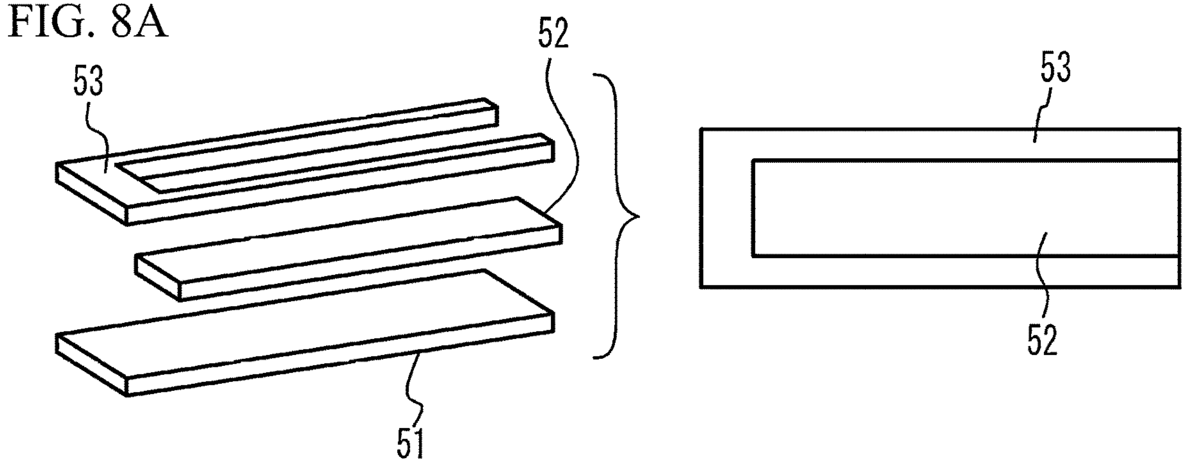
FIG. 8A and FIG. 8B illustrate a forming process of an internal electrode.

(Forming of internal electrode) Next, as illustrated in FIG. 8A, a metal conductive paste containing an organic binder for forming internal electrodes is printed on the surface of the ceramic green sheet 51 by screen printing, gravure printing, or the like. Internal electrode patterns 52 are arranged alternately to a pair of external electrodes. Ceramic particles are added to the metal conductive paste as a co-material. Although the main component of the ceramic particles is not particularly limited, it is preferably the same as the main component ceramic of the dielectric layer 11. For example, barium titanate having an average particle size of 50 nm or less may be uniformly dispersed.

Next, a binder such as ethyl cellulose and an organic solvent such as terpineol are added to the dielectric ceramic composition obtained in the raw material powder manufacturing process, and the mixture is kneaded in a roll mill to form a dielectric pattern paste for the reverse pattern layer. As illustrated in FIG. 8A, on the ceramic green sheet 51, a dielectric pattern 53 is arranged by printing a dielectric pattern paste in the peripheral area where the internal electrode pattern 52 is not printed, and a gap with the internal electrode pattern 52 is filled. The ceramic green sheet 51 on which the internal electrode pattern 52 and the dielectric pattern 53 are printed is referred to as a stack unit.

Figure 8B:
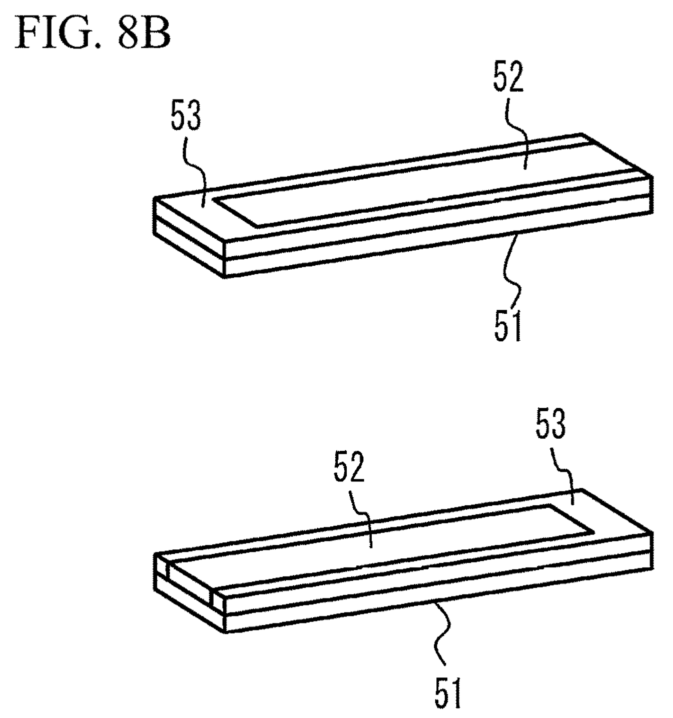

Thereafter, as illustrated in FIG. 8B, the internal electrode layers 12 and the dielectric layers 11 are arranged alternately, and the internal electrode layers 12 have edges on both longitudinal end surfaces of the dielectric layers 11. The stack units are stacked so that they are alternately exposed and drawn out alternately to a pair of the external electrodes 20*a* and 20*b* having different polarities. For example, the number of stacked layers of the internal electrode pattern 52 is set to 100 to 1000 layers.

Figure 9:
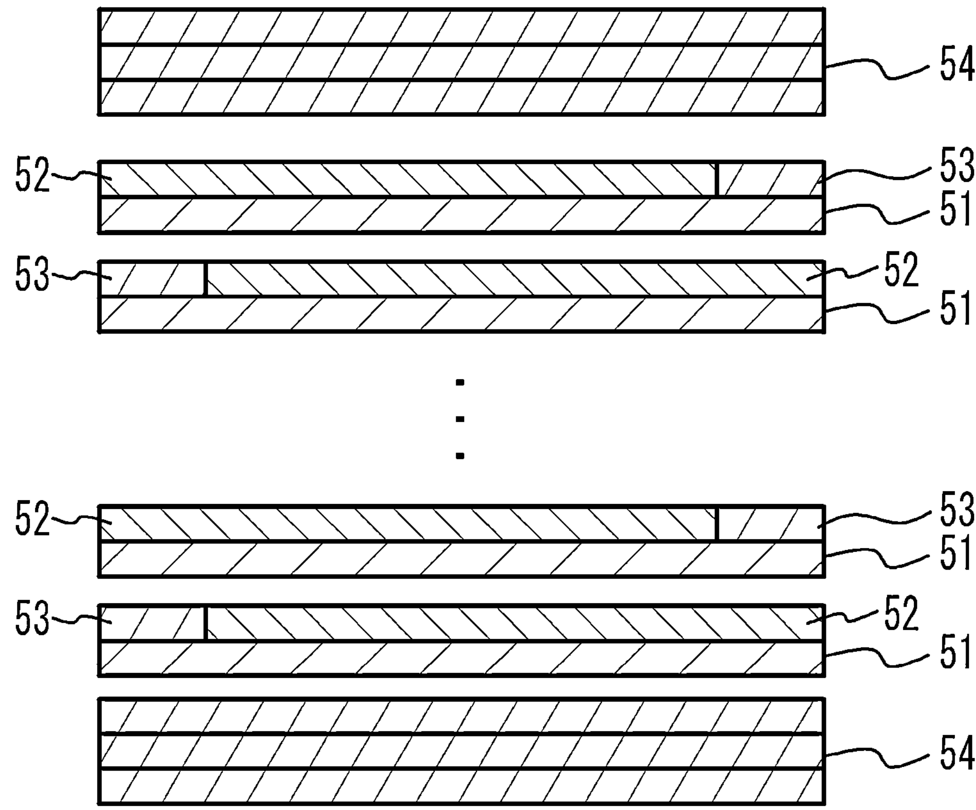
FIG. 9 illustrates a crimping process.

(Crimping Process) As illustrated in FIG. 9, a predetermined number (for example, 2 to 10 layers) of cover sheets 54 are stacked on top and bottom of the multilayer body in which the stack units are stacked and bonded by thermocompression. As an example of the ceramic material for the cover sheet 54, the dielectric ceramic composition described above can be used. Thereafter, the multilayer body is cut into a predetermined chip size (for example, 1.0 mm×0.5 mm).

(Firing process) After de-binding the ceramic multilayer body thus obtained in an $N_2$ atmosphere, air atmosphere or the like, a metal paste that will become the base layer of the external electrodes 20*a* and 20*b* is applied by a dip method, and the ceramic multilayer body is fired in a reductive atmosphere under an oxygen partial pressure of $10^{-10}$ to $10^{-7}$ atm, 1100° C. to 1300° C. for 10 minutes to 2 hours. In this way, the multilayer ceramic capacitor 100 is obtained. Note that in the firing step, the temperature is rapidly raised. The temperature increase rate in the firing step is, for example, 6000° C./h. Thereby, the second crystal grains 42 do not become huge grains, and furthermore, the time required for firing can be substantially shortened, and higher mass productivity can be achieved.

(Re-oxidation treatment process) Thereafter, re-oxidation treatment may be performed at 600° C. to 1000° C. in an $N_2$ gas atmosphere.

(Plating process) Thereafter, a metal coating such as Cu, Ni, Sn and so on is performed on the base layer of the external electrodes 20*a* and 20*b* by plating. Through the above steps, the multilayer ceramic capacitor 100 is completed.

Figure 10:
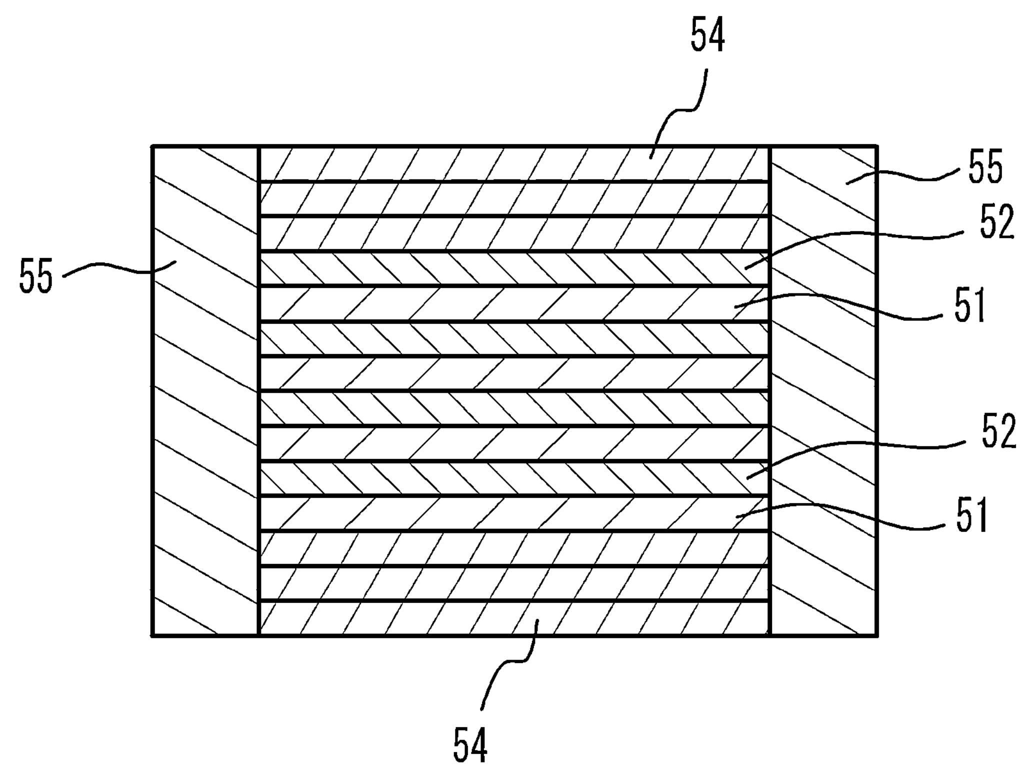
FIG. 10 illustrates a case where a side margin portion is attached.

The side margin section may be attached or coated on the side surface of the ceramic multilayer body. Specifically, as illustrated in FIG. 10, the ceramic multilayer body is obtained by alternately stacking the ceramic green sheets 51 and the internal electrode patterns 52 having the same width as the ceramic green sheets 51. Next, a sheet formed of the dielectric pattern paste may be attached as a side margin section 55 to the side surface of the ceramic multilayer body.

According to the manufacturing method according to the present embodiment, the first crystal grain 41 and the second crystal grain 42 illustrated in FIG. 1 are formed in at least a part of the dielectric layer in the capacity section 14. Therefore, changes in electrostatic capacity due to firing temperature can be suppressed and insulation can be increased in a wide firing atmosphere. As a result, it becomes possible to obtain high mass productivity.

The firing temperature dependence (Δε/° C.) of the relative dielectric constant due to a change in the firing temperature of the multilayer ceramic capacitor 100 is determined by the following method. First, electrostatic capacity Cp (nF) and direct current I (nA) are measured for the multilayer ceramic capacitor 100 that has undergone a firing process, a reoxidation process, and a plating process. Next, regarding the multilayer ceramic capacitor 100, the capacity section 14 is exposed by cutting or polishing or the like on the A-A line cross section and the B-B line cross section illustrated in FIG. 5 and FIG. 6. And finally, the effective area of the internal electrode layer is calculated using diamond paste or the like with a diameter of 2 μm or less in a state where a smoothness that can be considered as a mirror surface is obtained.

The effective area S is calculated from the length L and the number N of the internal electrode layers 12 in the capacity section 14 in FIG. 5, and the width W of the internal electrode layers 12 in the capacity section 14 in FIG. 6, as follows: $S=L\times W\times(N-1)$.

At this time, the thickness of each of the dielectric layers 11 is also measured, and the average thickness "t" is calculated. At this time, the relative dielectric constant "ε" can be calculated according to $\varepsilon=(Cp\times t/S)/\varepsilon_0$, vacuum permittivity: $\varepsilon_0=8.8542\times10^{-12}$ F/m.

Further, the DC resistivity ρ (Ω·cm) can be calculated according to $\rho=(V/I)\times(S/t)$, where the DC voltage at the time of measurement is V (V).

Regarding the electrostatic capacity Cp, it is generally preferable to measure it using an LCR meter. In the measurement, it is necessary to determine the measurement frequency and measurement voltage, but it is preferable that the measurement voltage is determined as a measurement electric field depending on the thickness of the dielectric layer 11. In this embodiment, the electrostatic capacity Cp can be measured at a room temperature of 25° C. with a measurement frequency of 1 kHz and a measurement electric field of 0.5 Vrms/μm, that is, when the thickness of the dielectric layer 11 is 2 μm, 1 Vrms.

As for the direct current I, it is generally preferable to measure it using an insulation resistance meter. In the measurement, it is necessary to determine the measurement voltage, but it is preferable to determine the measurement electric field depending on the thickness of the dielectric layer 11. In this embodiment, the multilayer ceramic capacitor 100 is held in a constant temperature bath at 150° C. for 30 minutes, insulation from the surroundings is ensured using a ceramic insulator or the like, a measurement electric field of 30 V/μm (for example, if the thickness of the dielectric layer 11 is 2 μm, 60 V for 30 seconds) is applied through the electric wires connected to the external electrodes 20*a* and 20*b* from the constant temperature bath. And the DC current I is calculated, and the DC resistivity p is calculated. Regarding measurements, unless otherwise specified, measurements shall be made in accordance with Japanese Industrial Standard C5101-22:2021 Fixed Capacitors for Electronic Equipment—Part 22: General Rules for Types—Fixed Multilayer Ceramic Capacitors for Surface Mounting Type 2.

Next, the DC resistivity ρ is measured for the multilayer ceramic capacitor obtained at each firing temperature, and the firing temperature that maintains the highest resistivity is determined as the optimal firing temperature. Generally, if the firing temperature is too low, the density will be low and the resistivity will be low. If the firing temperature is too high, the ceramic grains will become larger and the number of grain boundaries will decrease, resulting in a decrease in resistivity.

Next, based on the dielectric constant "ε" of the multilayer ceramic capacitor obtained at the firing temperature that maintains the highest resistivity and the firing temperature that maintains the highest resistivity, from the relative permittivity of the multilayer ceramic capacitor obtained by firing at −20° C. and +20° C. from the firing temperature, the slope of the straight line is calculated using the least squares method based on the firing temperature and the dielectric constant, and the slope of the straight line is determined as the firing temperature dependence of the dielectric constant (Δε/° C.), and used as an index of high mass productivity.

It is desirable that the DC resistivity measured at 150° C. is $1.0\times10^8$ Ω·cm or more. By setting the resistance to $1.0\times10^8$ Ω·cm or more, the multilayer ceramic capacitor 100 using the dielectric ceramic composition of this embodiment can have sufficient resistance.

It is more preferable that the DC resistivity measured at 150° C. is $1.0\times10^{10}$ Ω·cm or more. This is because, by having the DC resistivity of $1.0\times10^{10}$ Ω·cm or more, the multilayer ceramic capacitor 100 using the dielectric ceramic composition of this embodiment not only has sufficient resistance, but also has a thinner interior design and a stacked interior, and it becomes easier to increase the number of internal electrode layers.

It is preferable that Δε/° C. is 12 or less. When Δε/° C. is 12 or less, in the multilayer ceramic capacitor 100 using the dielectric ceramic composition of this embodiment, it is possible to achieve firing in a shorter time while suppressing changes in electrostatic capacity due to changes in firing temperature, and it becomes possible to obtain high mass productivity.

Furthermore, Δε/° C. is preferably 6 or less. When Δε/° C. is preferably 6 or less, in the multilayer ceramic capacitor 100 using the dielectric ceramic composition of the present embodiment, it is possible to achieve firing in a shorter time while also suppressing changes in electrostatic capacity due to changes in firing temperature. This makes it possible to control the amount of heat and achieve high mass productivity.

It is desirable that the dielectric constant "ε" is 2500 or more. Even if the DC resistivity measured at 150° C. is $2.0\times10^8$ Ω·cm or more and the firing temperature dependence Δε/° C. of the specific dielectric constant is 12 or less, if "ε" is small, the electrostatic capacity Cp becomes an insufficient value, resulting in characteristics unsuitable for use in the multilayer ceramic capacitor 100 using the dielectric ceramic composition.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLE (Example 1) Barium calcium titanate ($Ba_{0.95}Ca_{0.05}TiO_3$) powder with an average particle size of 150 nm and a molar ratio of barium and calcium of 95:5 was prepared, and 0.75 mol of $Gd_2O_3$ was added to 100 mol of barium calcium titanate powder. 0.5 mol of $TiO_2$, 1.5 mol of $MnCO_3$, 1.0 mol of $SiO_2$, and 0.5 mol of MgO were added to obtain a dielectric ceramic composition. The (Ba+Ca)/Ti elemental ratio was 0.995.

A dielectric slurry was prepared by mixing the dielectric ceramic composition with ethanol, toluene, and PVB (polyvinyl butyral) resin. This slurry was formed into a ceramic green sheet using a die coater. After drying this ceramic green sheet, nickel paste was printed to form an internal electrode pattern. The obtained stack units were stacked, and thick layers of ceramic green sheets on which no internal electrode pattern was formed were crimped on top and bottom, and then cut into small pieces. Thereafter, Ni paste was dipped on the two end faces as a conductive paste for external electrodes, and degreasing was performed in nitrogen gas. The degreased small piece was fired and sintered in a reducing atmosphere controlled to have an oxygen partial pressure that would not oxidize nickel, and a multilayer ceramic capacitor was fabricated. The firing temperature was 1220° C. The oxygen partial pressure was $3.1\times10^{-8}$ atm.

The size of the fabricated multilayer ceramic capacitor had 1005 shape (1.0 mm×1.0 mm×0.5 mm). Thereafter, re-oxidation treatment was performed at 950° C. Thereafter, plating was performed to form a Cu plating layer, a Ni plating layer, and a Sn plating layer on the surface of the base layer, thereby obtaining a multilayer ceramic capacitor. The average thickness of the dielectric layer 11 was 2.0 μm.

(Example 2) In Example 2, 0.75 mol of $Gd_2O_3$, 1.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.990. The firing temperature was 1220° C. Other conditions were the same as in Example 1.

(Example 3) In Example 3, 0.75 mol of $Gd_2O_3$, 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.980. The firing temperature was 1230° C. Other conditions were the same as in Example 1.

(Example 4) In Example 4, 0.75 mol of $Gd_2O_3$, 4.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.962. The firing temperature was 1230° C. Other conditions were the same as in Example 1.

(Example 5) In Example 5, 0.75 mol of $Gd_2O_3$, 8.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.926. The firing temperature was 1260° C. Other conditions were the same as in Example 1.

(Comparative Example 2) In Comparative Example 1, $Gd_2O_3$ was not added, and 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.980. The firing temperature was 1230° C. Other conditions were the same as in Example 1.

(Comparative Example 2) In Comparative Example 2, 0.75 mol of $Gd_2O^3$, 0.2 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was set to 0.998. The firing temperature was 1220° C. Other conditions were the same as in Example 1.

For each of the multilayer ceramic capacitors of Examples 1 to 5 and Comparative Examples 1 and 2, electrostatic capacity Cp was measured at room temperature (25° C.) at 1 kHz and 1 Vrms using an LCR meter, and the direct current I at 150° C. was measured using an insulation resistance meter when 60 V was applied for 30 seconds. Further, the effective area S of the internal electrode layer and the average thickness "t" of the dielectric layer were calculated by exposing the cross section along the line A-A and the cross section along the line B-B in FIG. 4. The relative permittivity "ε" and the resistivity "ρ" were calculated from the effective area S and the average thickness "t". Then, the resistivity "ρ" of each of the multilayer ceramic capacitors of Examples 1 to 5 and Comparative Examples 1 and 2 was compared. With reference to the dielectric constant of multilayer ceramic capacitors fired at a temperature of −20° C. and +20° C. from the multilayer ceramic capacitor obtained at the firing temperature with the highest resistivity, the slope of the straight line was determined by the least squares method based on the firing temperature and the dielectric constant, and was defined as the firing temperature dependence of the dielectric constant (Δε/° C.).

Furthermore, a conductive substance such as osmium was deposited on the exposed dielectric layer, and a photograph of the crystal grains present in the dielectric layer was taken by SEM observation. Then, the average grain diameter of the crystal grains constituting the dielectric layer was calculated.

In addition, during SEM observation of the multilayer ceramic capacitor, the presence of the second crystal grain 42 was confirmed in the BSE image based on the difference in brightness. For parts that were observed darkly with relatively low brightness, the EDS composition evaluation method reveals that the crystal grains were made of barium titanate composite oxide with an elemental ratio "v" of barium to titanium of 0.70 or less. In addition, the elemental ratio of manganese to titanium was also confirmed for the part, and it was confirmed whether the elemental ratio "w" of Mn/Ti satisfied $0.02\le w\le 0.10$.

For each multilayer ceramic capacitor, in order to confirm the composition of the shell portion and core portion of the crystal grains of the dielectric layer, a sample for EDS observation using TEM was cut out using FIB, and a composition evaluation method using EDS was performed. It was confirmed that it had a core-shell structure.

In addition, for each multilayer ceramic capacitor, the cover layer, the end margin, the side margin, and the external electrodes, which were outside the capacity section, were separated by polishing or cutting, and then the dielectric layer that made up the capacity section was crushed. The diffraction profile of the powder was measured using an X-ray diffractometer (XRD) using Cu-Kα rays, and it was confirmed whether there were the second crystal grains 42 that could be identified as $Ba_4Ti_{11}O_{26}$.

Tables 1 and 2 summarize the amounts of additives added in Comparative Examples 1 and 2 and Examples 1 to 5, as well as their firing temperatures, average grain diameters, "ε", Δε/° C., and resistivity at 150° C.

TABLE 1

| | ADDED AMOUNT TO 100 MOL OF $Ba_{0.95}Ca_{0.05}TiO_3$ (mol) | | | | | (Ba + Ca)/Ti ELEMENTAL | FIRING TEMPERATURE | OXYGEN PARTIAL PRESSURE |
|---|---|---|---|---|---|---|---|---|
| | $Gd_2O_3$ | $TiO_2$ | $MnCO_3$ | $SiO_2$ | MgO | RATIO | (° C.) | (atm) |
| COMPARATIVE EXAMPLE 1 | 0 | 2.0 | 1.5 | 1.0 | 0.5 | 0.980 | 1230 | $3.1 \times 10^{-8}$ |
| COMPARATIVE EXAMPLE 2 | 0.75 | 0.2 | 1.5 | 1.0 | 0.5 | 0.998 | 1220 | $3.1 \times 10^{-8}$ |
| EXAMPLE 1 | 0.75 | 0.5 | 1.5 | 1.0 | 0.5 | 0.995 | 1220 | $3.1 \times 10^{-8}$ |
| EXAMPLE 2 | 0.75 | 1.0 | 1.5 | 1.0 | 0.5 | 0.990 | 1220 | $3.1 \times 10^{-8}$ |
| EXAMPLE 3 | 0.75 | 2.0 | 1.5 | 1.0 | 0.5 | 0.980 | 1230 | $3.1 \times 10^{-8}$ |
| EXAMPLE 4 | 0.75 | 4.0 | 1.5 | 1.0 | 0.5 | 0.962 | 1240 | $3.1 \times 10^{-8}$ |
| EXAMPLE 5 | 0.75 | 8.0 | 1.5 | 1.0 | 0.5 | 0.926 | 1260 | $3.1 \times 10^{-8}$ |

TABLE 2

| | AVERAGE GRAIN DIAMETER (nm) | ε | Δε/° C. | RESISTIVITY @150° C. (Ω · cm) |
|---|---|---|---|---|
| COMPARATIVE EXAMPLE 1 | 2500 | 2530 | 0.7 | $3.6 \times 10^{6}$ |
| COMPARATIVE EXAMPLE 2 | 550 | 4000 | 12.9 | $5.1 \times 10^{10}$ |
| EXAMPLE 1 | 420 | 3820 | 4.8 | $2.6 \times 10^{10}$ |
| EXAMPLE 2 | 380 | 3570 | 2.3 | $1.9 \times 10^{10}$ |
| EXAMPLE 3 | 330 | 3450 | 0.2 | $6.6 \times 10^{9}$ |
| EXAMPLE 4 | 360 | 3110 | 0.5 | $2.1 \times 10^{9}$ |
| EXAMPLE 5 | 340 | 3050 | 0.4 | $8.2 \times 10^{8}$ |

Comparative Example 1 is a comparative example in which gadolinium was not included as a rare earth element. Comparative Example 2 was a comparative example at the lower limit when the amount of $TiO_2$ added was small. In Comparative Example 1, since gadolinium was not included as a rare earth element, the grain size could not be controlled during firing, resulting in a large growth of 2500 nm, when the amount of $TiO_2$ added was 1.0 mol or more, Δε/° C. was 3 or less. For example, even when using a larger firing furnace than existing firing furnaces to increase productivity efficiency, the dielectric constant obtained with respect to the temperature distribution in the furnace, that is, the electrostatic capacity Cp values of a multilayer ceramic capacitor did not have a large distribution. For this reason, even in short-time firing due to rapid temperature rise, it is possible to achieve greater mass production. Further, since the average grain diameter was 500 nm or less and the resistivity was $2.0 \times 10^{8}$ Ω·cm or more, a preferable electrical life could be obtained.

In order to investigate the mechanism of the dielectric layer in detail, by performing STEM-EDS, SEM-EDS, and XRD measurements, it was determined whether a core-shell structure existed or Ba4Ti11O26 existed, whether the elemental ratio "v" of the total of Ba and Ca to Ti in the second crystal grain 42 is 0.16≤0.70, and whether the elemental ratio "w" of Mn to Ti was within a range of $0.02 \le w \le 0.10$, for the multilayer ceramic capacitors of Comparative Examples 1 and 2 and Examples 1 to 5. Table 3 shows the results.

TABLE 3

| | CORE-SHELL | SHELL ELEMENTAL RATIO Gd/Ti | SHELL ELEMENTAL RATIO Mn/Ti | CORE ELEMENTAL RATIO Gd/Ti | CORE ELEMENTAL RATIO Mn/Ti | $Ba_4Ti_{11}O_{26}$ | SECOND CRYSTAL GRAIN ELEMENTAL RATIO (Ba + Ca)/Ti | SECOND CRYSTAL GRAIN ELEMENTAL RATIO Mn/Ti |
|---|---|---|---|---|---|---|---|---|
| COMPARATIVE EXAMPLE 1 | ABSENCE | — | 0.010 | — | 0.009 | PRESENCE | 0.43 | 0.03 |
| COMPARATIVE EXAMPLE 2 | PRESENCE | 0.031 | 0.028 | 0.000 | 0.003 | ABSENCE | — | — |
| EXAMPLE 1 | PRESENCE | 0.028 | 0.032 | 0,000 | 0.003 | PRESENCE | 0.55 | 0.05 |
| EXAMPLE 2 | PRESENCE | 0.025 | 0.027 | 0.000 | 0.002 | PRESENCE | 0.49 | 0.04 |
| EXAMPLE 3 | PRESENCE | 0.023 | 0.026 | 0.001 | 0.000 | PRESENCE | 0.41 | 0.03 |
| EXAMPLE 4 | PRESENCE | 0.025 | 0.024 | 0.000 | 0.002 | PRESENCE | 0.37 | 0.03 |
| EXAMPLE 5 | PRESENCE | 0.027 | 0.022 | 0.000 | 0.001 | PRESENCE | 0.28 | 0.04 |

resulting in a low resistance state. In Comparative Example 2, since gadolinium was contained as a rare earth element, the average grain diameter was 550 nm, and the resistivity at 150° C. was $5.1 \times 10^{10}$ Ωcm, making it possible to maintain sufficient resistivity. However, since a sufficient amount of TiO2 was not added, the value of Δε/° C. was 12.9, making it impossible to obtain a preferable value of 12 or less.

In Examples 1 to 5, the amount of $TiO_2$ added was 0.5 mol to 8.0 mol per 100 mol of $Ba_{0.95}Ca_{0.05}TiO_3$, and the Ba/Ti element ratio x in the dielectric layer was $0.926 \le x \le 0.995$. In this range, the value of Δε/° C. was 12 or less. In particular, In Comparative Example 1, a core-shell structure could not be obtained because the sample did not contain gadolinium, which was a rare earth element. In Comparative Example 2, since the amount of $TiO_2$ added was insufficient, the presence of $Ba_4Ti_{11}O_{26}$ could not be revealed by XRD measurement. Further, in SEM-EDS, it was not possible to confirm the presence of second the crystal grains 42, which were observed darkly and had a relatively low brightness with respect to the main crystal grains made of barium titanate.

On the other hand, in Examples 1 to 5, it was determined that a core-shell structure existed, $Ba_4T_{11}O_{26}$ was present in XRD, and the elemental ratio "v" of Ba to Ti and the elemental ratio w of Mn to Ti in the second crystal grains 42 were in the range of $0.16 \leq v \leq 0.70$ and $0.02 \leq w \leq 0.10$, so the presence of the second crystal grains 42 was also evident. Furthermore, as shown in Table 1, the value of Δε/° C. was 12 or less, the resistivity was $2.0 \times 10^8$ Ω·cm or more, and the average grain diameter was 500 nm or less, and the dielectric constant was "ε" of 2500 or more. Therefore, even when using a larger firing furnace than existing firing furnaces in order to increase productivity efficiency, for example, the relative dielectric constant obtained with respect to the temperature distribution in the furnace, that is, the electrostatic static capacity Cp did not have a large distribution. Therefore, even in short-time firing due to rapid temperature rise, it is possible to achieve mass production and to obtain sufficient reliability.

[Confirmation of the Influence of Oxygen Partial Pressure in the Firing Process]

(Example 6) In Example 6, 0.75 mol of $Gd_2O_3$, 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.980. The firing temperature was 1230° C. The oxygen partial pressure was $5.3 \times 10^{-9}$ atm. Other conditions were the same as in Example 1.

(Example 7) In Example 7, 0.75 mol of $Gd_2O_3$, 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.980. The firing temperature was 1230° C. The oxygen partial pressure was $1.1 \times 10^{-10}$ atm. Other conditions were the same as in Example 1.

(Comparative Example 3) In Comparative Example 3, $Gd_2O_3$ was not added, and 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.980. The firing temperature was 1230° C. The oxygen partial pressure was $5.3 \times 10^{-9}$ atm. Other conditions were the same as in Example 1.

(Comparative Example 4) In Comparative Example 4, $Gd_2O_3$ was not added, and 2.0 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.980. The firing temperature was 1230° C. The oxygen partial pressure was $2.2 \times 10^{-20}$ atm. Other conditions were the same as in Example 1.

(Comparative Example 5) In Comparative Example 5, 0.75 mol of $Gd_2O_3$, 0.2 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.998. The firing temperature was 1220° C. The oxygen partial pressure was $5.3 \times 10^{-9}$ atm. Other conditions were the same as in Example 1.

(Comparative Example 6) In Comparative Example 6, 0.75 mol of $Gd_2O_3$, 0.2 mol of $TiO_2$, 1.5 mol of $MnCO_3$, 1.0 mol of $SiO_2$ and 0.5 mol of MgO were added to 100 mol of barium calcium titanate powder with a molar ratio of barium and calcium of 95:5 to obtain a dielectric ceramic composition. The (Ba+Ca)/Ti elemental ratio was 0.998. The firing temperature was 1220° C. The oxygen partial pressure was $1.1 \times 10^{-10}$ atm. Other conditions were the same as in Example 1.

Tables 4 and 5 summarize the amounts of additives added in Comparative Examples 1 to 6 and Examples 3, 6, and 7, as well as their firing temperatures, oxygen partial pressures, average grain diameters, "ε", and resistivity at 150° C.

TABLE 4

| | ADDED AMOUNT TO 100 MOL OF $Ba_{0.95}Ca_{0.05}TiO_3$ (mol) | | | | | (Ba + Ca)/Ti ELEMENTAL RATIO | FIRING TEMPERATURE (° C.) | OXYGEN PARTIAL PRESSURE (atm) |
|---|---|---|---|---|---|---|---|---|
| | $Gd_2O_3$ | $TiO_2$ | $MnCO_3$ | $SiO_2$ | MgO | | | |
| COMPARATIVE EXAMPLE 1 | 0 | 2.0 | 1.5 | 1.0 | 0.5 | 0.980 | 1230 | $3.1 \times 10^{-8}$ |
| COMPARATIVE EXAMPLE 3 | 0 | 2.0 | 1.5 | 1.0 | 0.5 | 0.980 | 1230 | $5.3 \times 10^{-9}$ |
| COMPARATIVE EXAMPLE 4 | 0 | 2.0 | 1.5 | 1.0 | 0.5 | 0.980 | 1230 | $1.1 \times 10^{-10}$ |
| COMPARATIVE EXAMPLE 2 | 0.75 | 0.2 | 1.5 | 1.0 | 0.5 | 0.998 | 1220 | $3.1 \times 10^{-8}$ |
| COMPARATIVE EXAMPLE 5 | 0.75 | 0.2 | 1.5 | 1.0 | 0.5 | 0.998 | 1220 | $5.3 \times 10^{-9}$ |
| COMPARATIVE EXAMPLE 6 | 0.75 | 0.2 | 1.5 | 1.0 | 0.5 | 0.998 | 1220 | $1.1 \times 10^{-10}$ |
| EXAMPLE 3 | 0.75 | 2.0 | 1.5 | 1.0 | 0.5 | 0.980 | 1230 | $3.1 \times 10^{-8}$ |
| EXAMPLE 6 | 0.75 | 2.0 | 1.5 | 1.0 | 0.5 | 0.980 | 1230 | $5.3 \times 10^{-9}$ |
| EXAMPLE 7 | 0.75 | 2.0 | 1.5 | 1.0 | 0.5 | 0.980 | 1230 | $1.1 \times 10^{10}$ |

TABLE 5

| | AVERAGE GRAIN DIAMETER (nm) | ε | RESISTIVITY @150° C. (Ω · cm) |
|---|---|---|---|
| COMPARATIVE EXAMPLE 1 | 2500 | 2530 | $3.6 \times 10^6$ |
| COMPARATIVE EXAMPLE 3 | 2600 | 2610 | $8.2 \times 10^5$ |
| COMPARATIVE EXAMPLE 4 | 2500 | 2550 | $2.8 \times 10^5$ |
| COMPARATIVE EXAMPLE 2 | 550 | 4000 | $5.1 \times 10^{10}$ |

TABLE 5-continued

| | AVERAGE GRAIN DIAMETER (nm) | ε | RESISTIVITY @150° C. (Ω · cm) |
|---|---|---|---|
| COMPARATIVE EXAMPLE 5 | 580 | 4390 | $6.9 \times 10^9$ |
| COMPARATIVE EXAMPLE 6 | 630 | 4670 | $2.5 \times 10^8$ |
| EXAMPLE 3 | 330 | 3450 | $6.6 \times 10^9$ |
| EXAMPLE 6 | 320 | 3470 | $1.2 \times 10^{10}$ |
| EXAMPLE 7 | 340 | 3480 | $8.6 \times 10^9$ |

Comparative Examples 1, 3, and 4 are dielectric ceramic compositions in which the oxygen partial pressure during firing was changed from $3.1\times10^{-8}$ to $1.1\times10^{-10}$ atm when gadolinium was not included as a rare earth element. In Comparative Examples 1, 3, and 4, since gadolinium was not included as a rare earth element, the grain size could not be controlled during firing, resulting in large growth of 2500 to 2600 nm, resulting in a low resistance state.

Comparative Examples 2, 5, and 6 are dielectric ceramic compositions when the amount of $TiO_2$ added is small and the oxygen partial pressure during firing in the lower limit state was changed from $3.1\times10^{-8}$ to $1.1\times10^{-10}$ atm. In Comparative Examples 2, 5, and 6, gadolinium was contained as a rare earth element, but when heat treatment was performed in an atmosphere with a reduced oxygen partial pressure, the average grain diameter grew from 450 nm to 630 nm, and the dielectric constant increased by about 15%. A dielectric material with a stable dielectric constant against changes in oxygen partial pressure could not be obtained.

Examples 3, 6, and 7 are examples of dielectric ceramic compositions in which the oxygen partial pressure during firing was changed in the range of $3.1\times10^{-8}$ to $1.1\times10^{-10}$ atm. The variation in dielectric constant with respect to oxygen partial pressure was 1% or less. Therefore, even when using a larger firing furnace than existing firing furnaces to increase productivity efficiency, for example, the dielectric constant obtained with respect to the distribution of the firing atmosphere in the furnace, that is, the electrostatic capacity Cp does not have a large distribution. Therefore, it is possible to achieve higher mass production and to obtain sufficient reliability.

Although the embodiments of the present invention have been described in detail, it is to be understood that the various change, substitutions, and alterations could be made hereto without departing from the spirit and scope of the invention.

What is claimed is:

1. A dielectric ceramic composition comprising:

a first crystal grain that has a perovskite structure expressed by a general formula of $BaCaTiO_3$, and has a core portion and a shell portion surrounding the core portion and including a rare earth element and manganese; and a second crystal grain in which an elemental ratio of total of barium and calcium to titanium is 0.70 or less and a main component is barium calcium titanate, the second crystal grain including at least $Ba_4Ti_{11}O_{26}$.

2. The dielectric ceramic composition as claimed in claim 1, wherein the rare earth element is gadolinium.

3. The dielectric ceramic composition as claimed in claim 2, wherein the elemental ratio of the total of barium and calcium to titanium is 0.926 or more and 0.995 or less, wherein an elemental ratio of gadolinium to titanium is 0.005 or more and 0.05 or less, and wherein an elemental ratio of manganese to titanium is 0.002 or more and 0.05 or less.

4. The dielectric ceramic composition as claimed in claim 1, further comprising:

silicon of which an elemental ratio to titanium is 0.002 or more and 0.05 or less, and magnesium of which an elemental ratio to titanium is 0.00 or more and 0.05 or less.

5. The dielectric ceramic composition as claimed in claim 1, wherein a concentration of the rare earth element in the shell portion is larger than that in the core portion, and wherein a concentration of manganese in the shell portion is larger than that in the core portion.

6. The dielectric ceramic composition as claimed in claim 1, wherein a maximum grain diameter of the first crystal grain is 2 μm or less.

7. The dielectric ceramic composition as claimed in claim 1, wherein an elemental ratio of a total of barium and calcium to titanium in the second crystal grain is 0.16 or more.

8. The dielectric ceramic composition as claimed in claim 1, wherein the second crystal grain further includes at least one selected from a group of $BaTi_4O_9$, $BaTi_5O_{11}$, $BaTi_6O_{13}$, $Ba_4Ti_{12}O_{27}$, $Ba_4Ti_{13}O_{30}$, or $Ba_6Ti_{17}O_{40}$.

9. The dielectric ceramic composition as claimed in claim 1, wherein the second crystal grain includes manganese, and wherein an elemental ratio of manganese to titanium in the second crystal grain is 0.02 or more and 0.10 or less.

10. The dielectric ceramic composition as claimed in claim 1, wherein the second crystal grain includes manganese, and wherein an elemental ratio of manganese to titanium in the second crystal grain is 0.02 or more and 0.05 or less.

11. A multilayer ceramic electronic device comprising:

a dielectric ceramic composition as claimed in claim 1.

12. The multilayer ceramic electronic device as claimed in claim 11 further comprising:

a plurality of internal electrode layers;

a dielectric layer that is sandwiched by the plurality of internal electrode layers and includes the dielectric ceramic composition; and an external electrode that is electrically connected to the plurality of internal electrode layers.

13. A dielectric ceramic composition comprising:

a first crystal grain that has a perovskite structure expressed by a general formula of $BaCaTiO_3$, and has a core portion and a shell portion surrounding the core portion and including a rare earth element and manganese; and a second crystal grain which is barium titanate composite oxide in which an elemental ratio of total of barium and calcium to the barium titanate composite oxide is smaller than an elemental ratio of titanium to the barium titanate composite oxide, the second crystal grain including at least $Ba_4Ti_{11}O_{26}$, wherein the second crystal grain includes manganese and has an elemental ratio of manganese to titanium of 0.02 or more and 0.10 or less.

14. The dielectric ceramic composition as claimed in claim 13, wherein the barium titanate composite oxide further includes at least one selected from a group of $BaTi_4O_9$, $BaTi_5O_{11}$, $BaTi_6O_{13}$, $Ba_4Ti_{12}O_{27}$, $Ba_4Ti_{13}O_{30}$, or $Ba_6Ti_{17}O_{40}$.

15. The dielectric ceramic composition as claimed in claim 13, wherein the rare earth element is gadolinium.

16. The dielectric ceramic composition as claimed in claim 15, wherein an elemental ratio of the total of barium and calcium to titanium is 0.926 or more and 0.995 or less, wherein an elemental ratio of gadolinium to titanium is 0.005 or more and 0.05 or less, and wherein an elemental ratio of manganese to titanium is 0.002 or more and 0.05 or less.

17. The dielectric ceramic composition as claimed in claim 13, further comprising:

silicon of which an elemental ratio to titanium is 0.002 or more and 0.05 or less, and magnesium of which an elemental ratio to titanium is 0.00 or more and 0.05 or less.

18. The dielectric ceramic composition as claimed in claim 13, wherein a concentration of the rare earth element in the shell portion is larger than that in the core portion, and wherein a concentration of manganese in the shell portion is larger than that in the core portion.

19. The dielectric ceramic composition as claimed in claim 13, wherein a maximum grain diameter of the first crystal grain is 2 μm or less.

20. The dielectric ceramic composition as claimed in claim 13, wherein an elemental ratio of manganese to titanium in the second crystal grain is 0.02 or more and 0.05 or less.

* * * * *